INVENTOR.
JAMES A. HARDMAN
BY M. Ralph Shaffer
HIS ATTORNEY

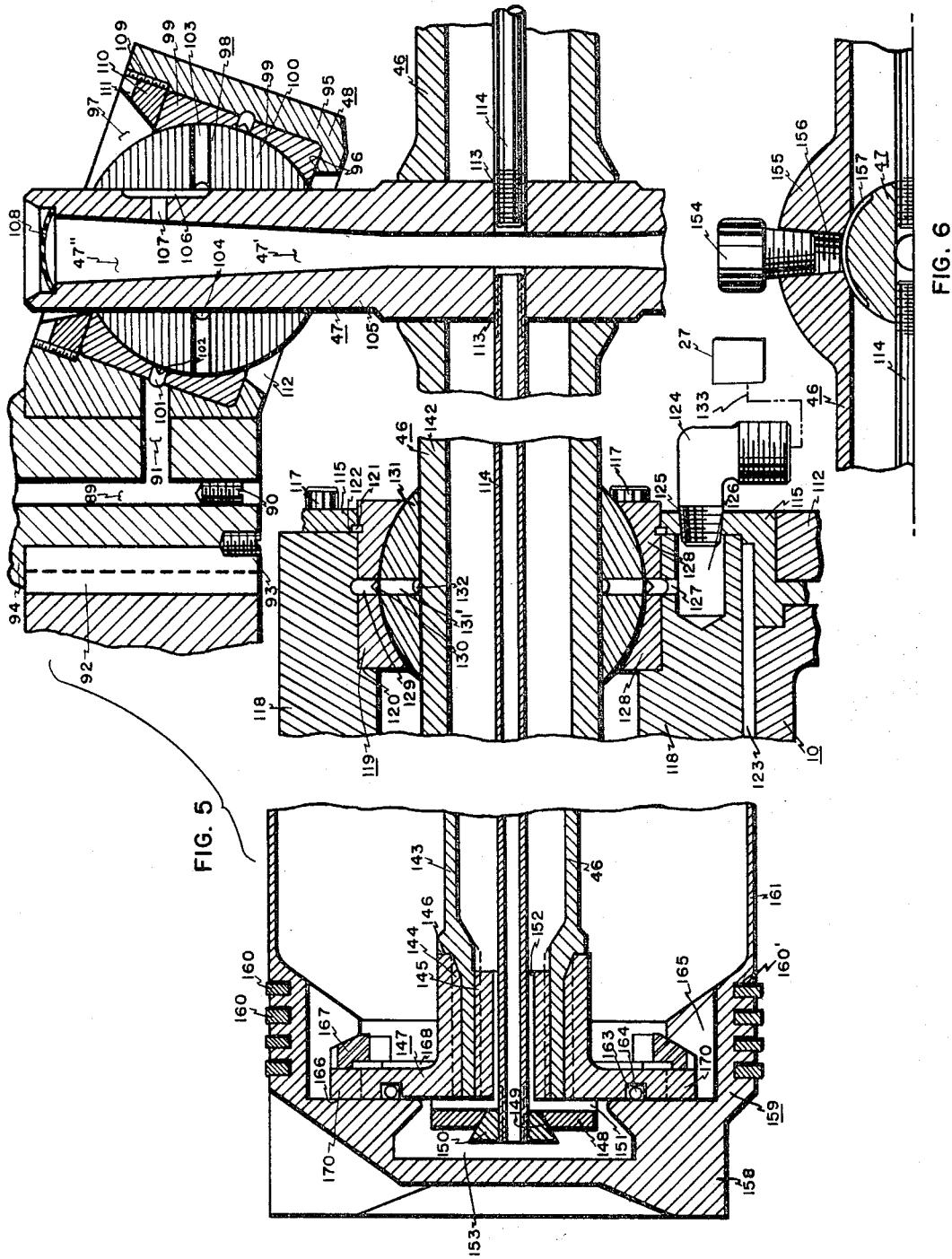

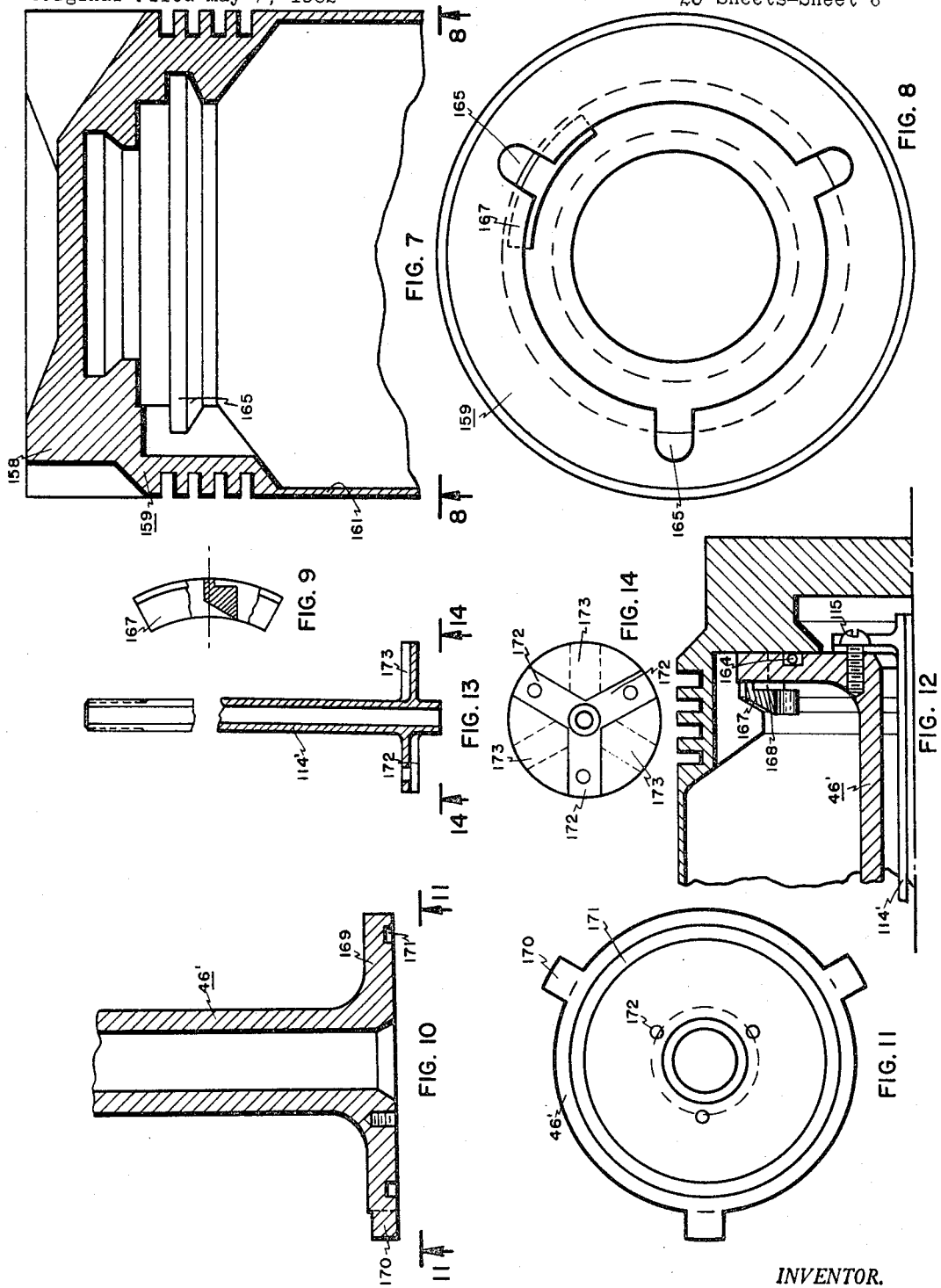

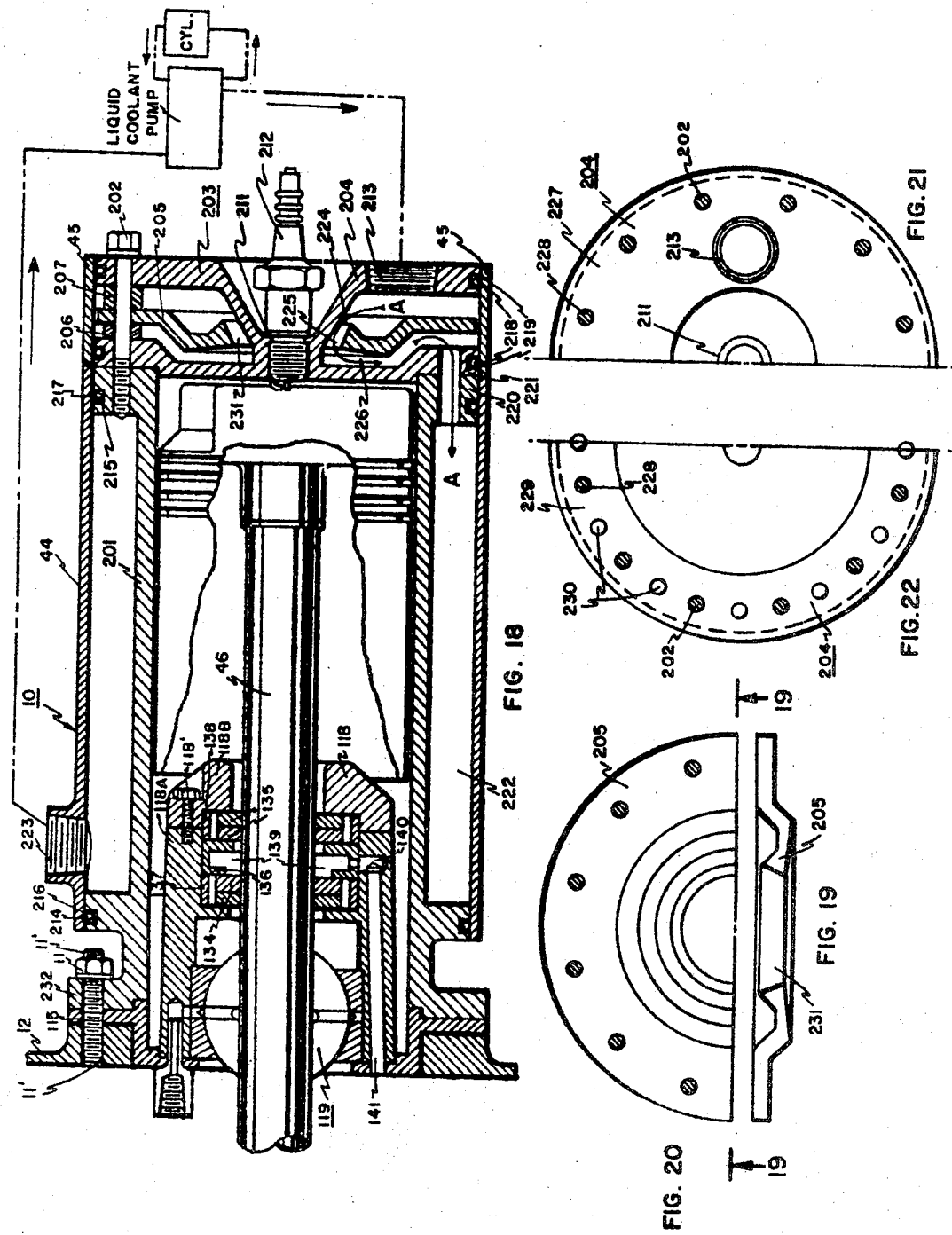

Aug. 27, 1968  J. A. HARDMAN  3,398,728
TWO PISTON SLEEVE PORT ENGINE
Original Filed May 7, 1962  23 Sheets-Sheet 9

INVENTOR.
JAMES A. HARDMAN
BY M. Ralph Shaffer
HIS ATTORNEY

Aug. 27, 1968     J. A. HARDMAN     3,398,728
TWO PISTON SLEEVE PORT ENGINE
Original Filed May 7, 1962               23 Sheets-Sheet 10

*INVENTOR.*
JAMES A. HARDMAN
BY M. Ralph Shaffer
HIS ATTORNEY

INVENTOR.
JAMES A. HARDMAN
BY *M. Ralph Shaffer*
HIS ATTORNEY

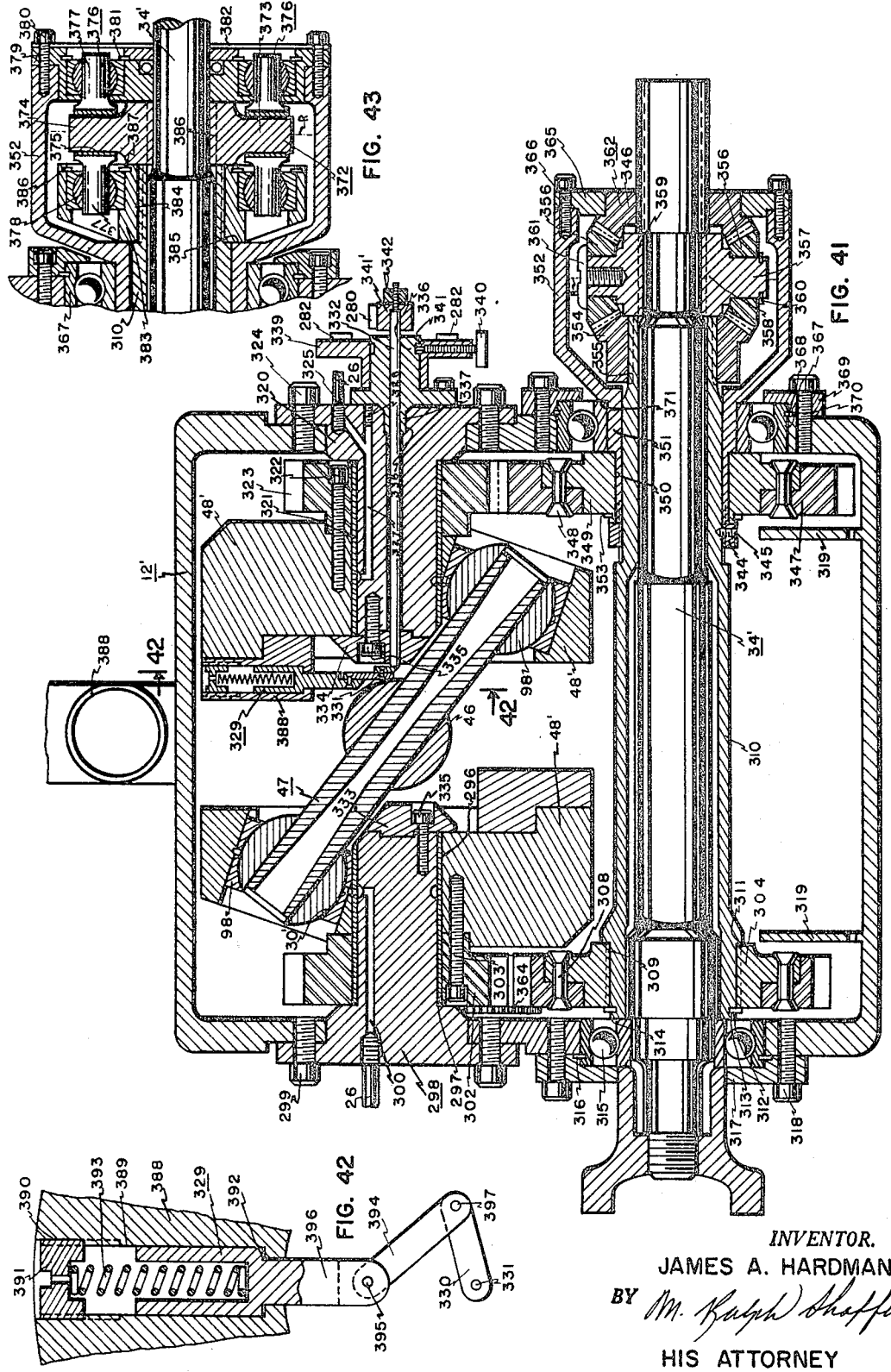

Aug. 27, 1968    J. A. HARDMAN    3,398,728
TWO PISTON SLEEVE PORT ENGINE
Original Filed May 7, 1962    23 Sheets-Sheet 17

INVENTOR.
JAMES A. HARDMAN
BY M. Ralph Shaffer
HIS ATTORNEY

Aug. 27, 1968  J. A. HARDMAN  3,398,728
TWO PISTON SLEEVE PORT ENGINE
Original Filed May 7, 1962  23 Sheets-Sheet 18
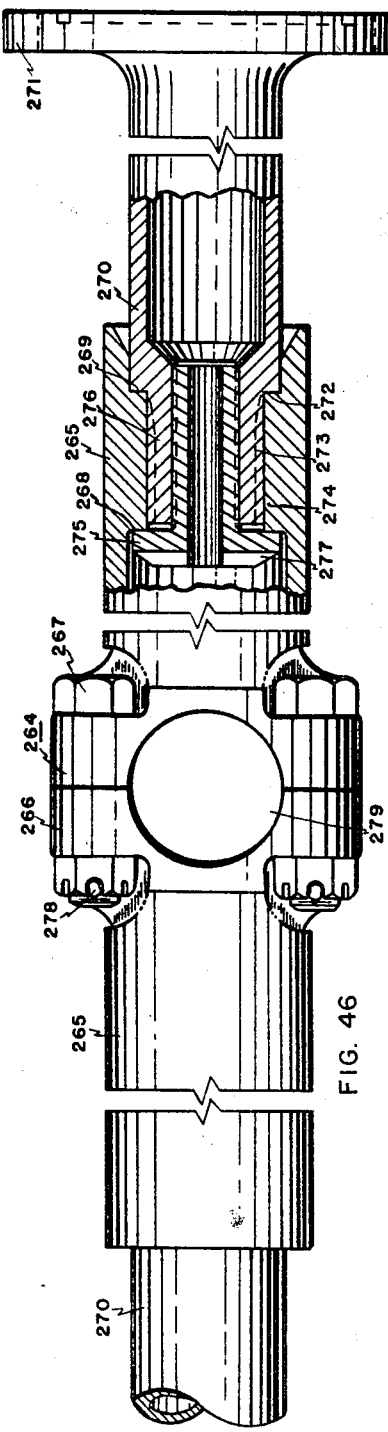
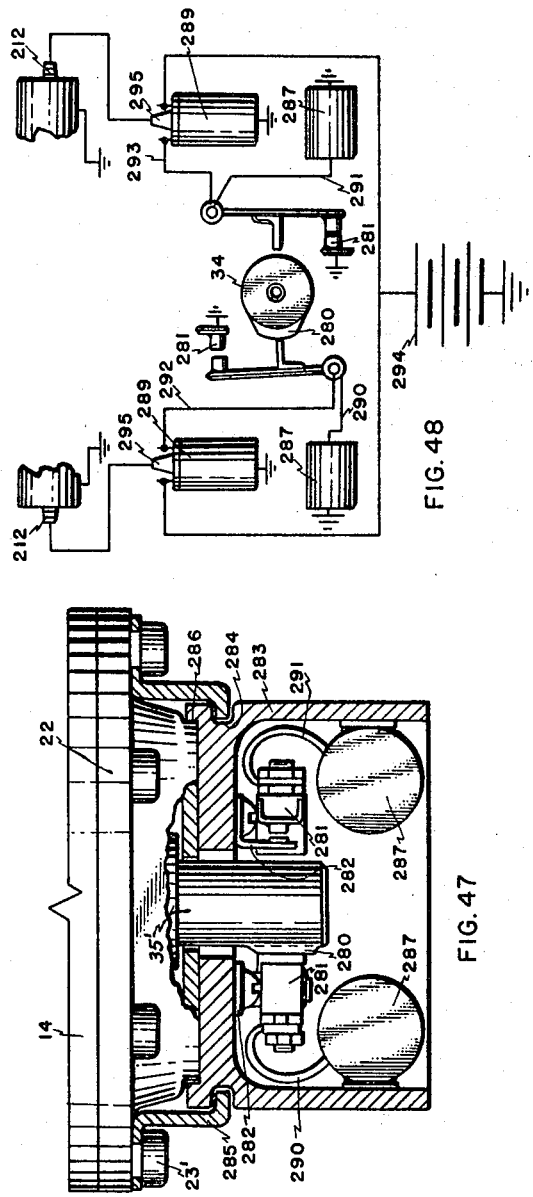
INVENTOR.
JAMES A. HARDMAN
BY
HIS ATTORNEY

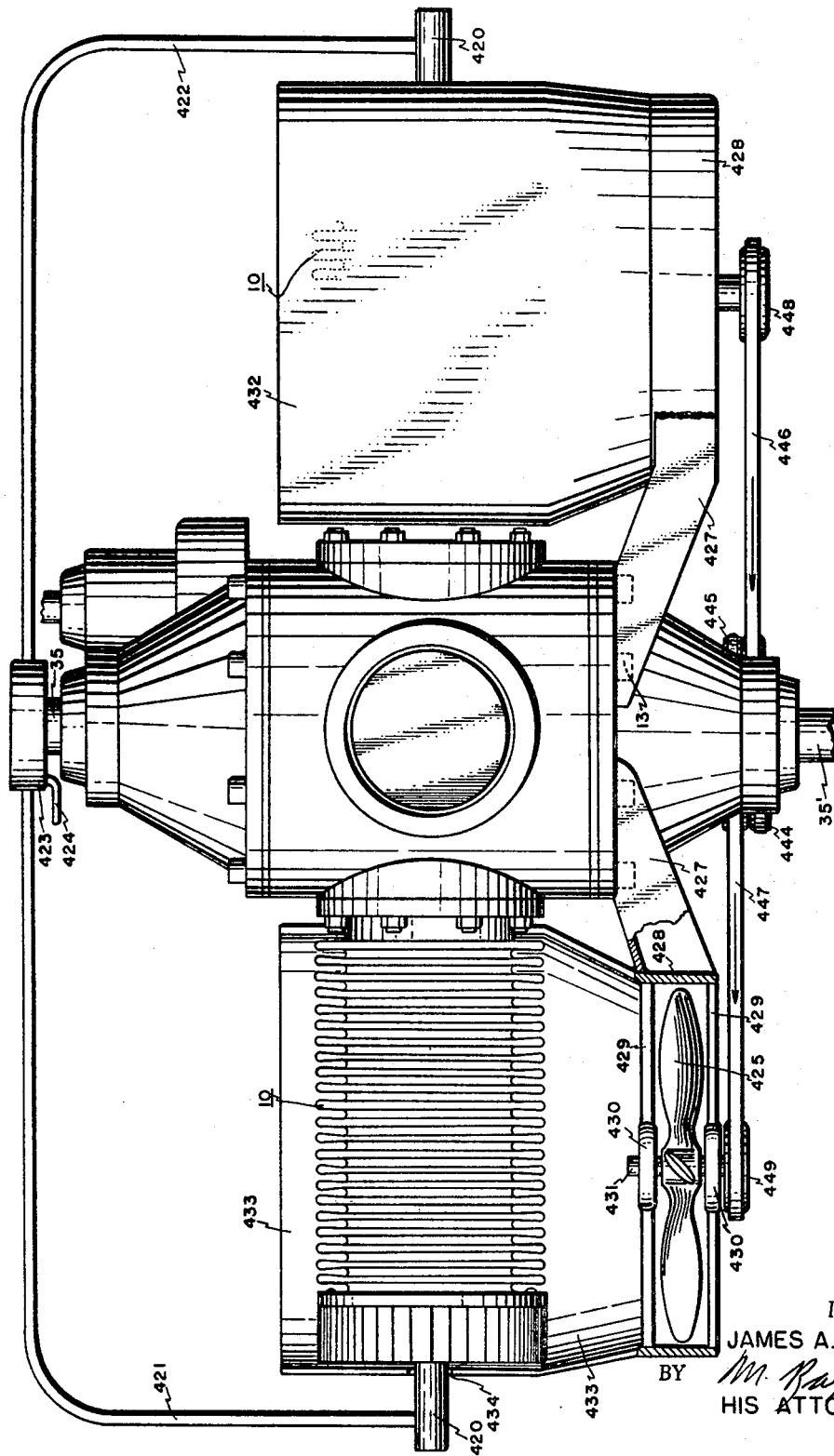

INVENTOR.
JAMES A. HARDMAN
BY
HIS ATTORNEY

Aug. 27, 1968  J. A. HARDMAN  3,398,728
TWO PISTON SLEEVE PORT ENGINE
Original Filed May 7, 1962  23 Sheets-Sheet 22
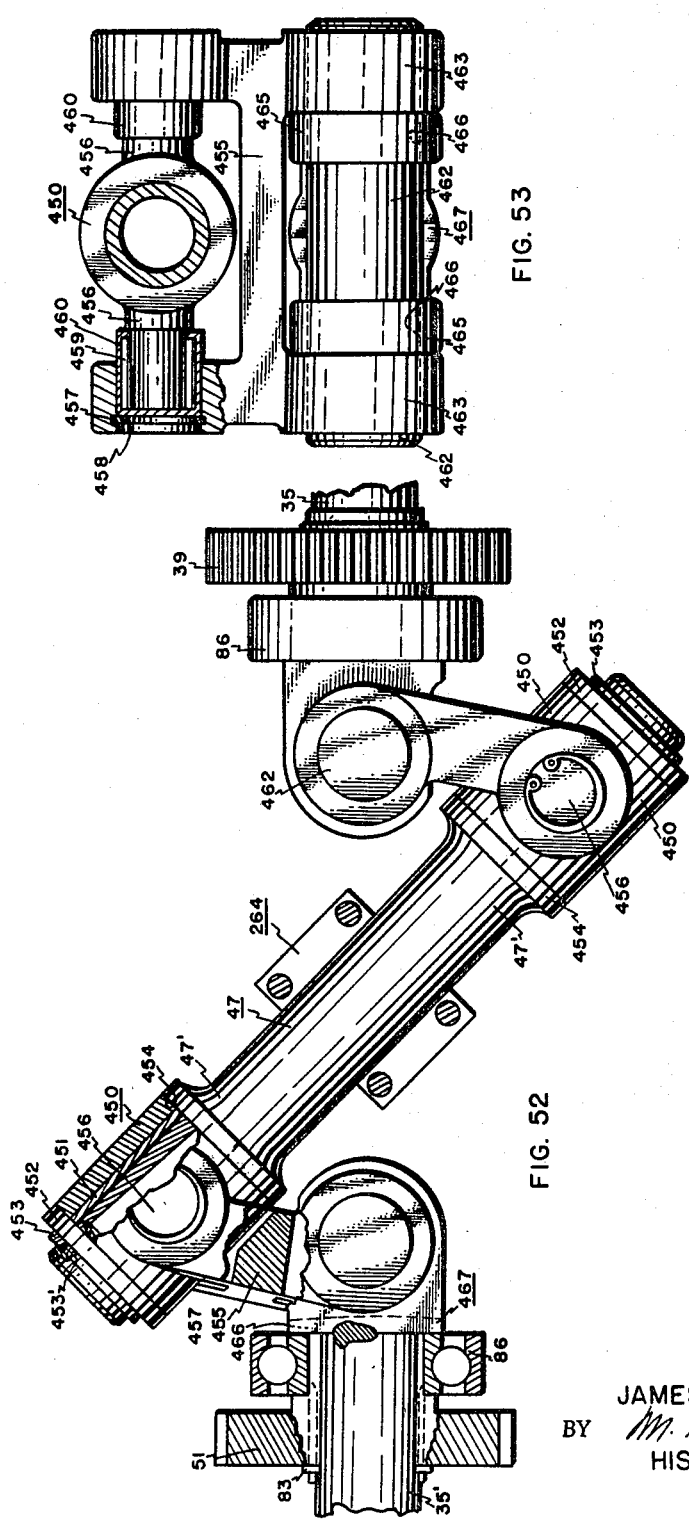
INVENTOR.
JAMES A. HARDMAN
BY
HIS ATTORNEY

TYPICAL PORT TIMING CHART

United States Patent Office 3,398,728
Patented Aug. 27, 1968

1

3,398,728
TWO PISTON SLEEVE PORT ENGINE
James A. Hardman, Logan, Utah
(1095 Hyland Lake Circle, Salt Lake City, Utah 84121)
Continuation of application Ser. No. 195,651, May 7, 1962, which is a continuation-in-part of application Ser. No. 119,485, June 26, 1961. This application Aug. 6, 1965, Ser. No. 482,983
16 Claims. (Cl. 123—56)

ABSTRACT OF THE DISCLOSURE

This invention is embodied in a reciprocating piston, internal combustion engine of the sleeve port type and includes a two cylinder, two cycle construction with said cylinders being directly opposed and connected by a single piston rod which is operably associated with and actuates a shuttle and flywheel mechanism, said latter components converting the reciprocating motion of the opposed pistons to rotary output power in the output shaft of the engine.

This invention relates to reciprocating piston, internal combustion engines of the sleeve port type and, more particularly, to a new and improved, two piston sleeve port engine in which piston side thrust is more satisfactorily eliminated than hitherto, porting is markedly improved for greater engine efficiency, and in which the intercooperation of the two opposed pistons of the engine is unique and highly advantageous for the purposes hereinafter set forth, this application constituting a continuation of application Serial No. 195,651, filed May 7, 1962, and now abandoned, which abandoned application constituted a continuation-in-part of application Serial No. 119,485, filed June 26, 1961, and now abandoned.

The present invention is a two cylinder, two cycle, internal combustion engine having directly opposed cylinders, with a single piston rod, common to both pistons, actuating a shuttle and flywheel mechanism and the latter converting the reciprocating motion of the pistons to rotary output power. The general concept of using a shuttle for converting reciprocatory motion to rotary motion is set forth in my patent entitled, "Motion Transforming Mechanism," United States Patent No. 2,480,854, issued Sept. 6, 1949, and further in my later patent entitled, "Engine," United States Patent No. 2,828,906, issued Apr. 1, 1958.

The present invention adds to the broad principles disclosed in these patents novel structural means to effect a unique and highly advantageous, two cylinder, two cycle engine design.

The present invention also provides for "back-stroke scavenging," i.e. the intaking of fuel-air mixture (or, in the case of Diesel fuel injection, only air) beneath the piston head during the compression stroke and subsequently, during the bottom portion of the power or back stroke, displacing the volume beneath the piston head to expel the exhaust gases above the piston and recharge this cylinder above the piston for the following compression stroke, thus completing the equivalent of a conventional, two-cycle function.

Principal objects of the present invention are to provide an efficient, balanced, two-cycle engine in which back-stroke scavenging will occur and wherein the reciprocating and rotational motions of opposed pistons are efficiently transmitted to one or more driven members.

Outstanding features of the invention include an output shaft, i.e. a driven member, and drive means arranged such that the shaft is axially rotated by the simultaneous reciprocation and rotation of opposed pistons. Converse-

2 ly, axial rotation of the output shaft can also be transmitted through the drive means to reciprocate and rotate the opposed pistons. The pistons are designed so that scavenging will occur during their stroke and the pistons, piston cylinders, piston rods, transverse shuttle means and rotors associated with the piston connecting shaft and the bearings, journals and stuffing glands therefore are continuously lubricated and cooled. At least one propeller, i.e. a driven member, is arranged to be driven with the rotors, and is positioned to force air through an air flow directing air foil.

Additional objects and features will become apparent from the following detailed description and drawings, disclosing what are presently contemplated as being the best modes of the invention.

In the drawings:

FIGURE 5 is an enlarged, fragmentary, broken away view taken along the line 5—5 in FIGURE 1 and illustrates the middle portion of the structure as being rotated 90° toward the viewer to illustrate the oil feed and spherical control bearings of the system.

FIGURE 6 is a vertical section, shown enlarged in scale, taken along the line 6—6 in FIGURE 2 and illustrates the oil pressure relief valve and its connection to the piston rod of the engine.

FIGURE 7 is a fragmentary, enlarged vertical section of a representative piston head of the subject engine.

FIGURE 8 is a view taken along the line 8—8 in FIGURE 7 and illustrates the inner contour of a typical piston head structure.

FIGURE 9 is a detail of one of the representative locking lugs employed in securing the piston rod mounting flange to the piston head; the part is shown broken away, and there is included within the broken lines a section view of the part.

FIGURE 10 is an enlarged, fragmentary vertical section of the end of a representative piston rod of the engine which, as shown, is flanged to receive the piston.

FIGURE 11 is a view taken along the line 11—11 in FIGURE 10, showing the flanged portion of the piston rod with the associated, rotation locking projections thereof.

FIGURE 12 is a half-section of the piston and push rod assembly, according to one form of the invention, in which the locking lugs are shown in place and retained by the locking snap ring.

FIGURE 13 is a view in reduced scale, shown in partial section, of a representative oil feed line which connects between the oil passage of the shuttle and the cooling chamber in the crown of its associated piston.

FIGURE 14 is a view taken along the line 14—14 in FIGURE 13 and illustrates the oil return apertures and spanner wrench recesses of the oil feed line of FIGURE 13.

Figure 15:
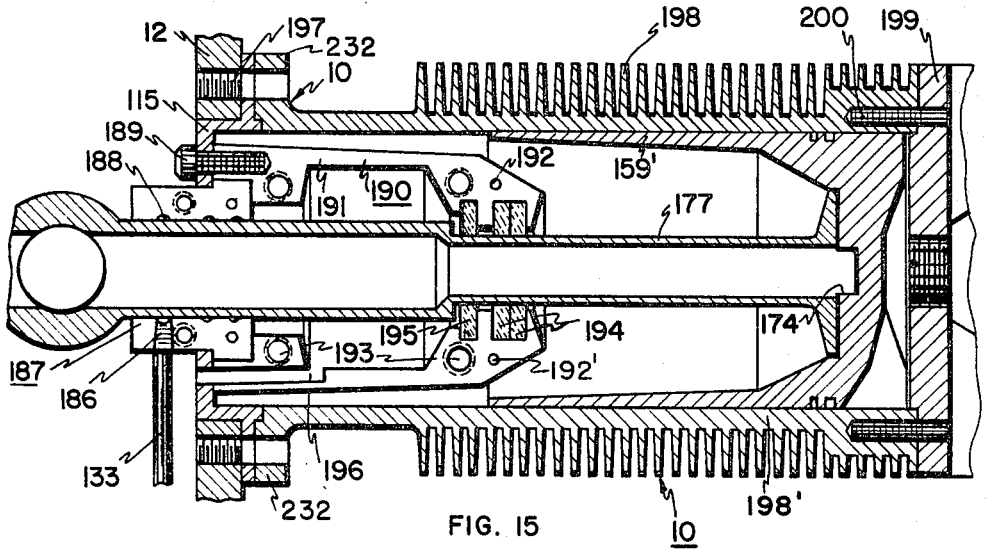

FIGURE 15 is a section of a portion of the engine indicating one engine construction wherein the piston rod is directly mounted to and centered with respect to the head of the piston; it further serves to illustrate the novel, stepped sections of the piston rod of the invention, the advantages of the design of which will be hereinafter set forth; the necessary piston rod seals and carrier bearings are also portrayed. The structure of this figure is shown to be enclosed within a typical, air cooling type structure.

Figure 16:
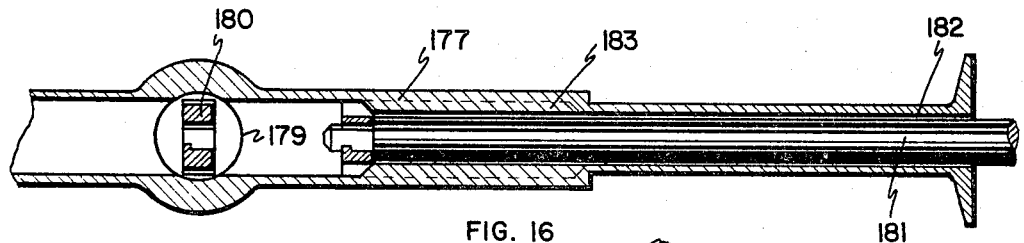
Figure 17:
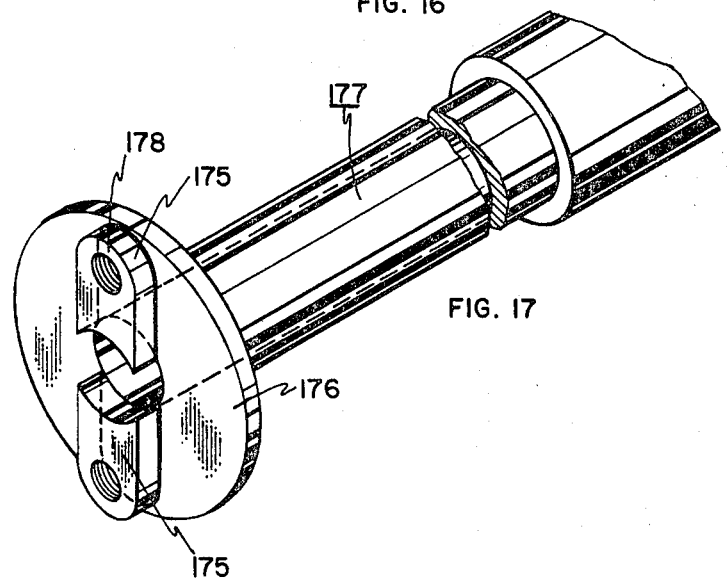

FIGURE 16 is a section of the stepped piston rod of the invention and shows, by way of construction detail, the manner in which excessive weight may be removed from within the piston rod by means of a conventional, counterboring tool; this figure also indicates the manner in which the cutting tool is preliminarily inserted into the shuttle hole of the piston rod preparatory to its assembly on the counterbore pickup shank of the cutting tool. FIGURE 17 is a fragmentary, enlarged perspective of the outer end of one representative piston rod and its mounting flange.

FIGURE 18 is a sectional view of a piston, cylinder, and piston rod assembly; the same includes water cooling means in lieu of the air cooling fins of the structure of FIGURE 15. This sectional view indicates with particularity the manner in which water is conveyed from the inlet of the head of the cylinder and is passed therefrom in a novel manner and by novel means to the cylinder water jacket area, to be outwardly transported therefrom.

FIGURE 19 is a sectional view of a plate-type, flow control vane employed in the structure of FIGURE 18.

FIGURE 20 is a representative half of the flow control vane of FIGURE 19, with the mounting bolts associated therewith passing through the apertures thereof and shown in section. For assembly purposes the flow control vane comes in two halves and is inserted in each side of the head structure to provide a coplanar, uniform plate of split construction.

FIGURES 21 and 22 are right and left sectors, respectively, of the upper and lower plate portions of the cylinder head.

Figure 23:
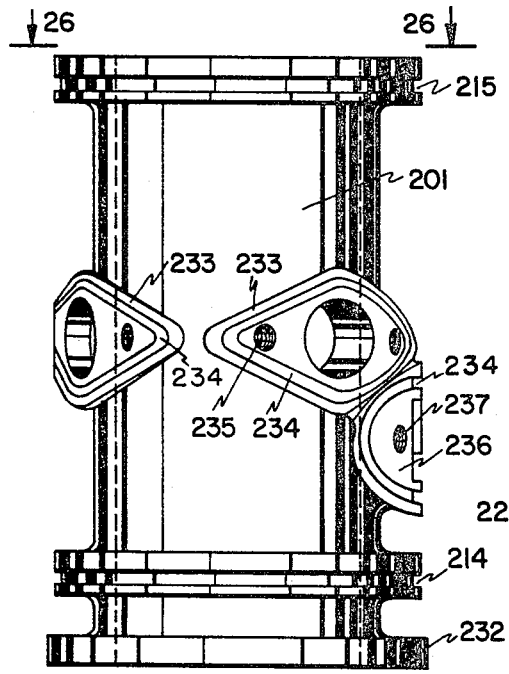

FIGURE 23 is a side elevation of a representative type of water cooled cylinder employed in the engine of the present invention.

Figure 24:
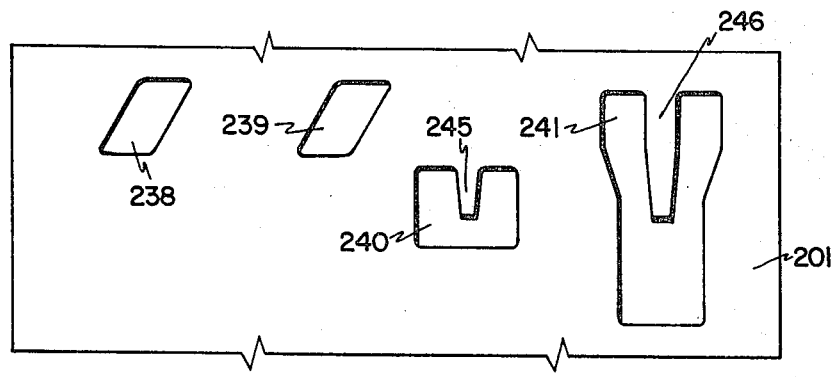

FIGURE 24 is a roll-out or developed view of a fragmentary portion of the inner wall surface of the cylinder of FIGURE 23, showing the relative port pattern of one of the two identical cylinders.

Figure 25:
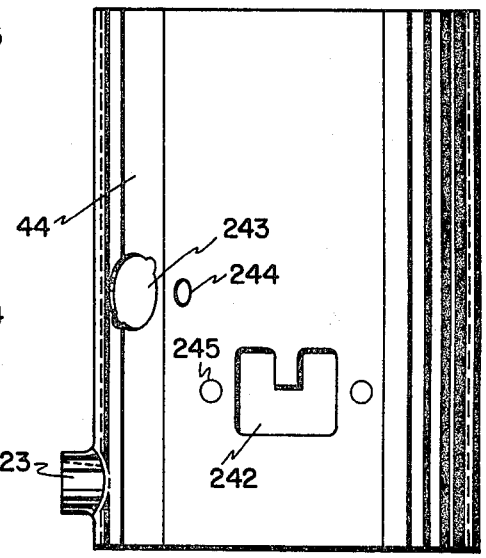

FIGURE 25 is an elevation of one type of water jacket member which may be employed with the cylinder construction of FIGURE 23. The jacket of FIGURES 23 and 25 is constructed to be of as great a dimension as possible lengthwise in order to achieve a maximum length, water cooling jacket.

Figure 26:
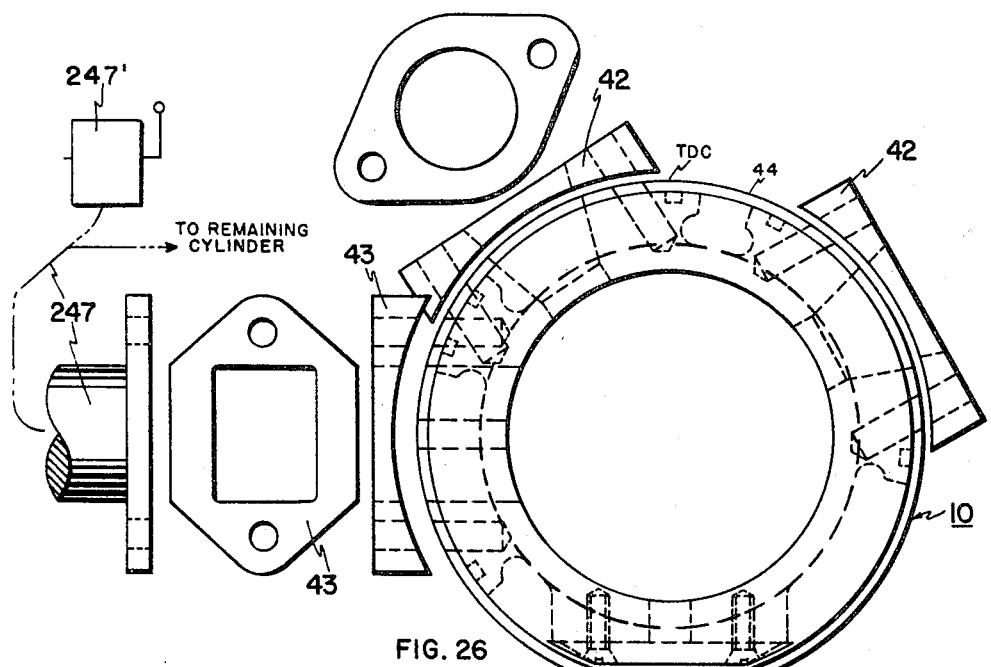

FIGURE 26 is a plan view of a representative cylinder with the water jacket installed, and illustrates the radial port locations together with the conduit mounting bosses.

Figures 27, 28, 28A:
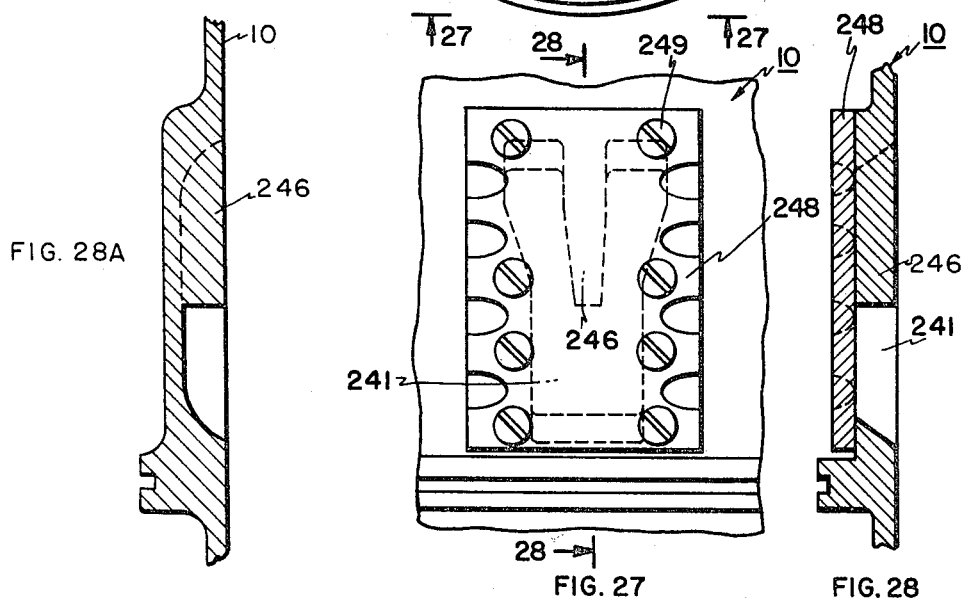
Figure 54:
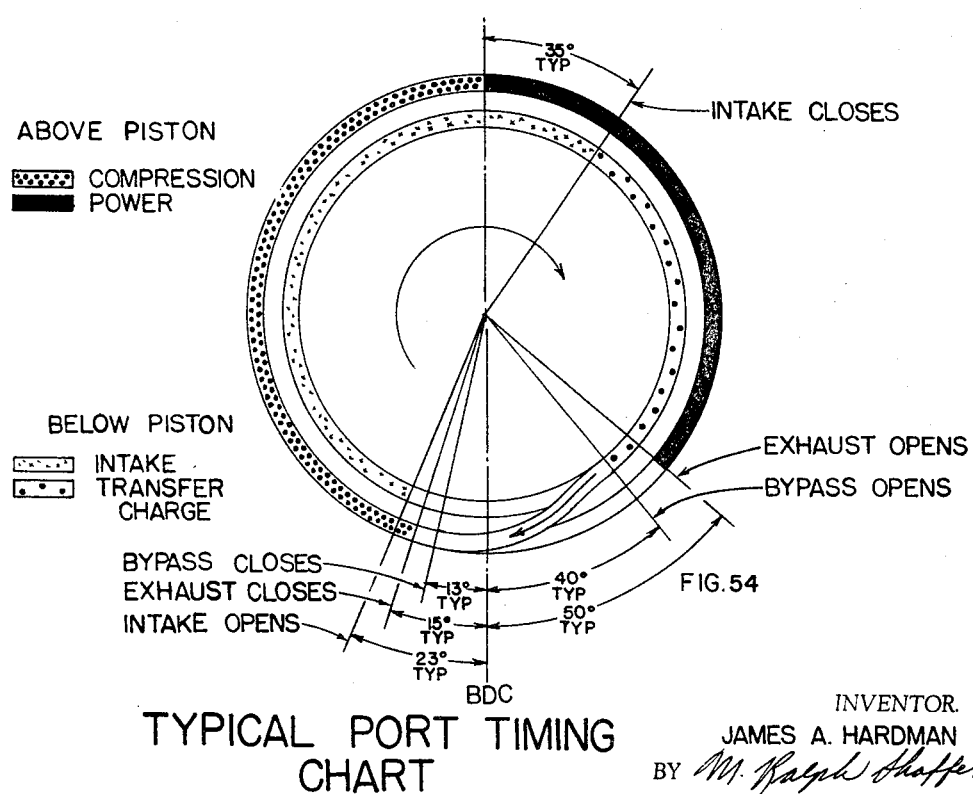

FIGURE 27 is an enlarged, partial detail taken along the line 27—27 of FIGURE 54 and shows circulation scallops of the bypass port cover.

FIGURE 28 is a section taken along line 28—28 in FIGURE 27.

FIGURE 28A is a section similar to FIGURE 28 but shows the bypass plate to be integral with the cylinder, the bypass port thereby being cut or cored into the cylinder during fabrication.

Figures 29, 30:
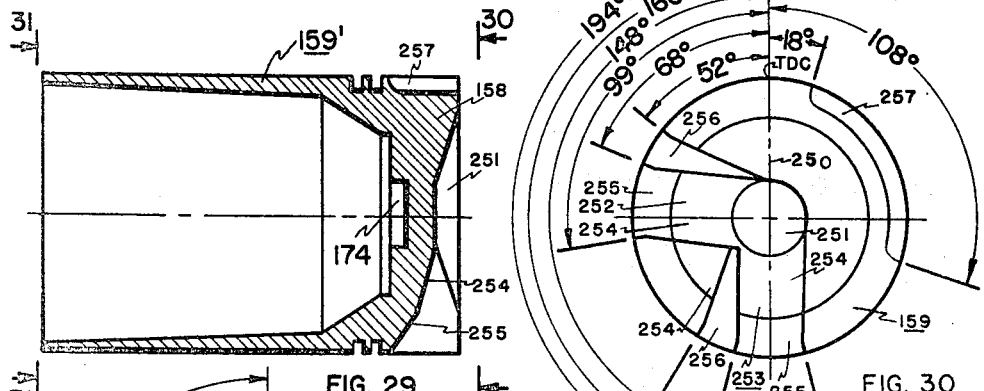

FIGURE 29 is a longitudinal, horizontal section of a representative piston of the present engine.

Figure 29A:
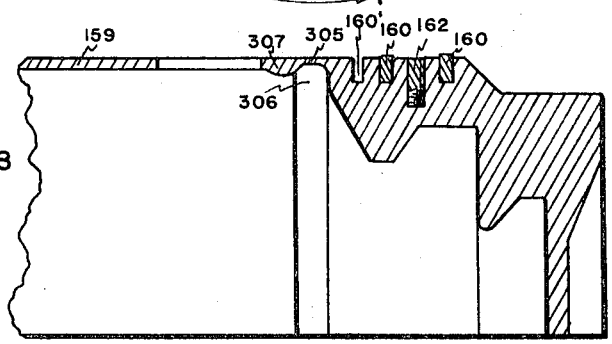

FIGURE 29A is an enlarged, fragmentary section of a representative piston, similar to that in FIGURE 29, but which illustrates one representative ring pin and also a piston skirt design incorporating an annular, heat transfer constriction with accompanying skirt reinforcement ring.

FIGURE 30 is a view taken along the line 30—30 in FIGURE 29 and illustrates the piston crown configuration together with the radial locations thereof.

Figure 31:
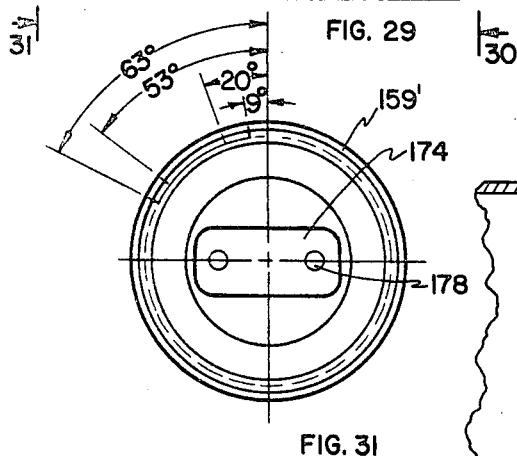

FIGURE 31 is a view taken along the line 31—31 in FIGURE 29 and illustrates the inner contour and rotational locking means of the piston to the piston rod flange.

Figure 32:
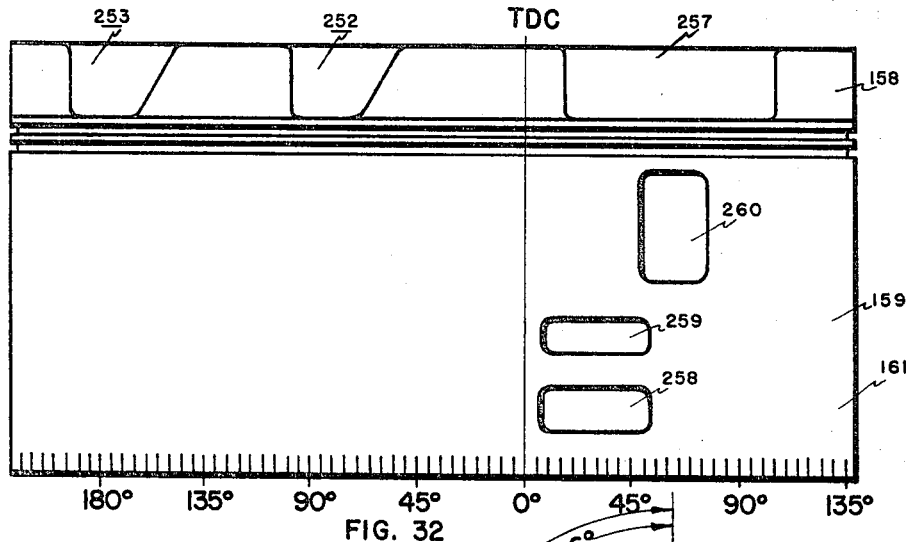

FIGURE 32 is a roll-out or developed view of a piston wall, illustrating port location and head contour.

FIGURES 33–40 are graphical illustrations of the relative registrations of cylinder ports and piston port openings for various positions of each piston during its stroke. The general framework of the drawing in heavy lines indicates a rollout of the cylinder wall, and the intermediate lines indicate the piston (including the skirt) rolled out. The dotted lines at the top and the dotted line midway down on FIGURE 23 represent the crown and the skirt bottom of the piston.

FIGURE 41 is a vertical section through one type engine wherein the torque means is mounted on the output shaft outside of the main housing and oil casing assembly.

FIGURE 42 is an enlarged detail, principally in section, of a spring controlled, ignition spark advance means.

FIGURE 43 is an enlarged, fragmentary, sectional view of an alternate means for equalizing torque to and from the rotating members of the engine.

Figure 44:
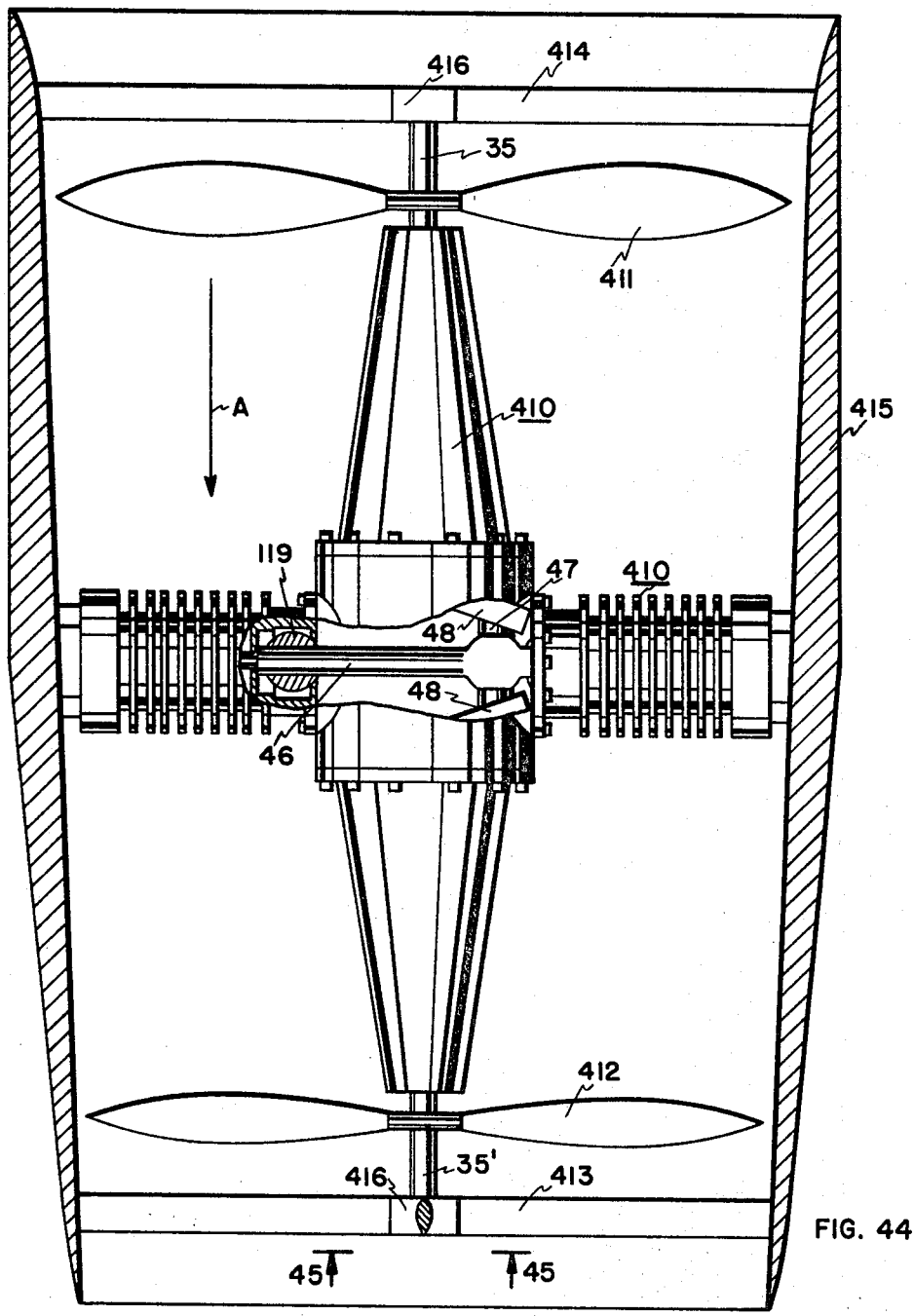

FIGURE 44 is a section of the engine of the present invention when the same incorporates a pair of oppositely rotating propellers and is mounted within a suitable airfoil structure.

Figure 45:
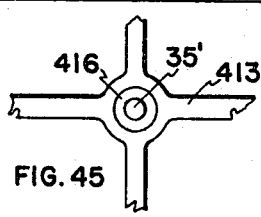

FIGURE 45 is an enlarged, fragmentary detail taken along the line 45—45 in FIGURE 44 to indicate the propeller shaft support journal and structure within the air foil enclosure.

FIGURE 46 is a fragmentary elevation, partially broken away and sectioned, of a composite stepped push rod which may be used.

Figure 2:
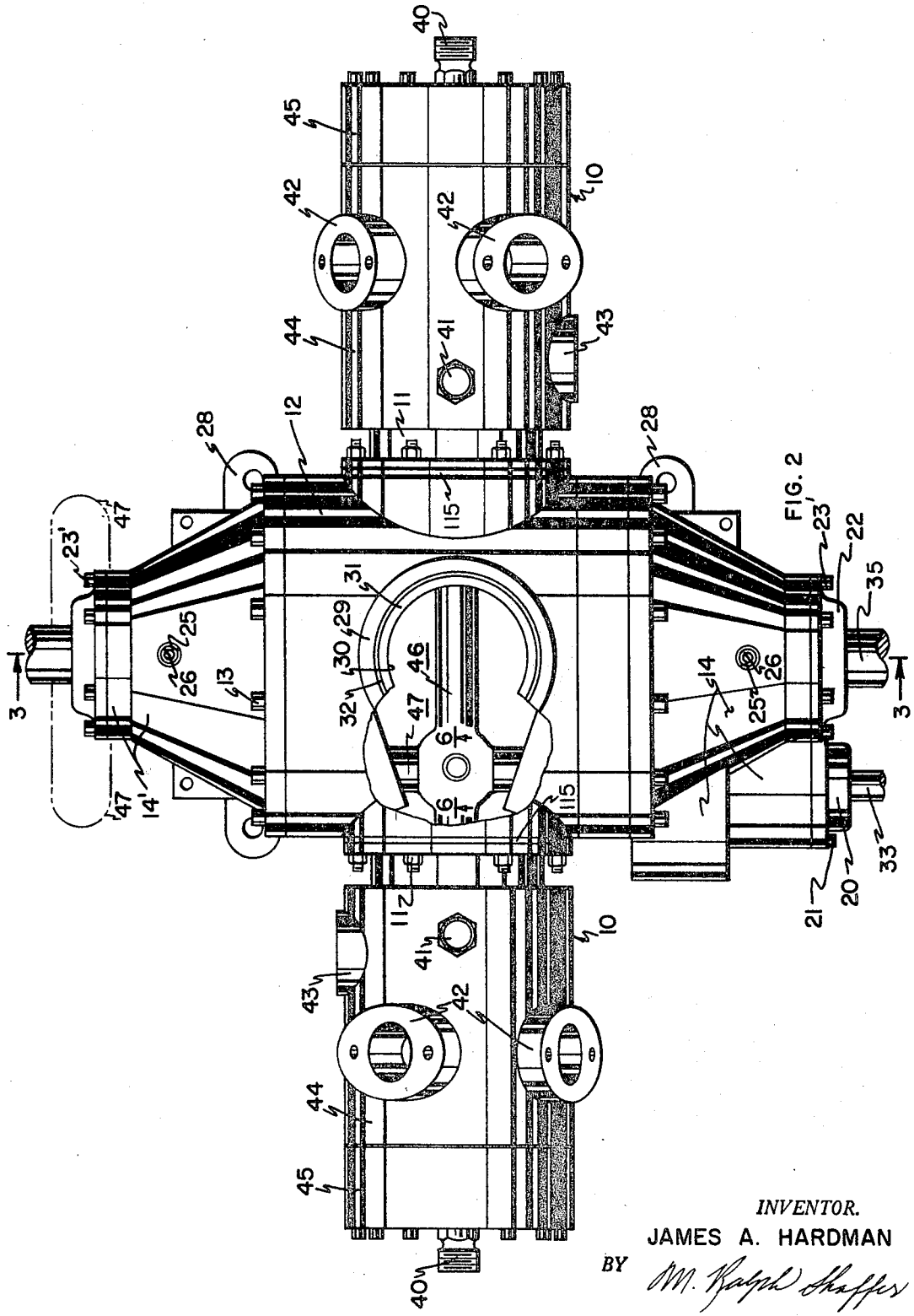
FIGURE 2 is a plan view, partially cut away for convenience of illustration, of the engine structure of FIGURE 1.

FIGURE 47 is an enlarged detail, taken along the arcuate line 47—47 in FIGURE 2, and illustrates generally the ignition distributor which may be used.

FIGURE 48 is a diagram of ignition wiring and structure.

FIGURE 49 is a plan view illustrating two separate features, to wit, an engine adapted for diesel fuel operation and also a means for air cooling a subject engine.

Figure 50:
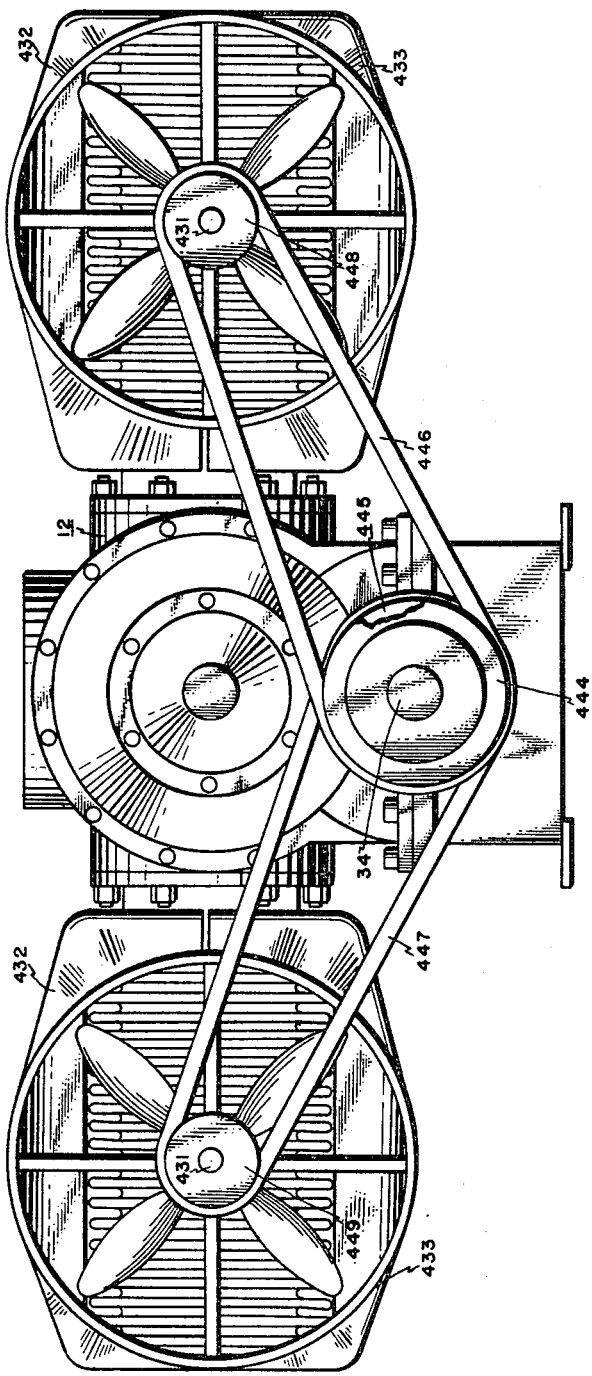

FIGURE 50 is a plan view, partially cut away, of part of the structure of FIGURE 49, illustrating the air fan drive which can be used.

Figure 51:
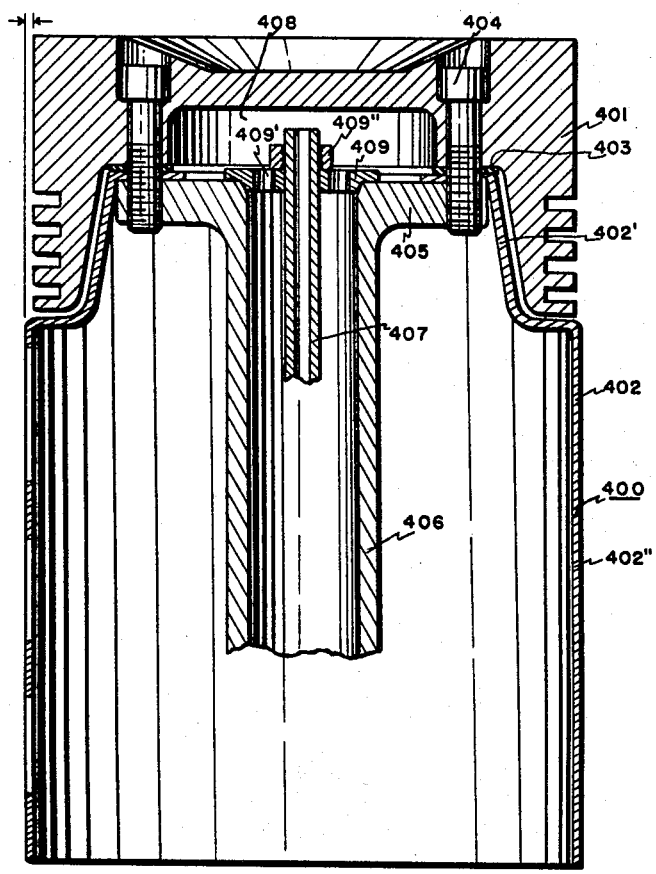

FIGURE 51 is a fragmentary section of a two-piece piston and piston rod therefor.

FIGURE 52 is an enlarged, fragmentary, partially sectioned elevation of alternate structure, with one yoke distorted in perspective for clarity, useable to transform the reciprocating motion of the piston rod to rotary motions at the rotors.

FIGURE 53 is an elevation of the yoke in FIGURE 52.

FIGURE 54 is a detailed pictorial representation of an illustrative example of the port timing relationships, relative to intake and exhaust, which may be used in practicing the invention.

In FIGURES 1, 2, 3 and 5 there is shown the basic structure of the engine of the invention. The engine includes a pair of water-cooled cylinders 10 which are secured by nuts 11 and studs 11' to rotor housing 12. Affixed to rotor housing 12 by means of cap screws 13 are two rotor carrying end bells 14 and 14'. Each of the end bells 14 and 14' is provided with a base mounting flange 15 which is affixed to the upper mounting flange 16 of oil chamber 17 by means of cap screws 18. The rotor housing 12 is also supplied with a mounting flange 19 (see FIGURE 3) which is secured to the oil chamber flange 16 by means of cap screws 18.

Figure 1:
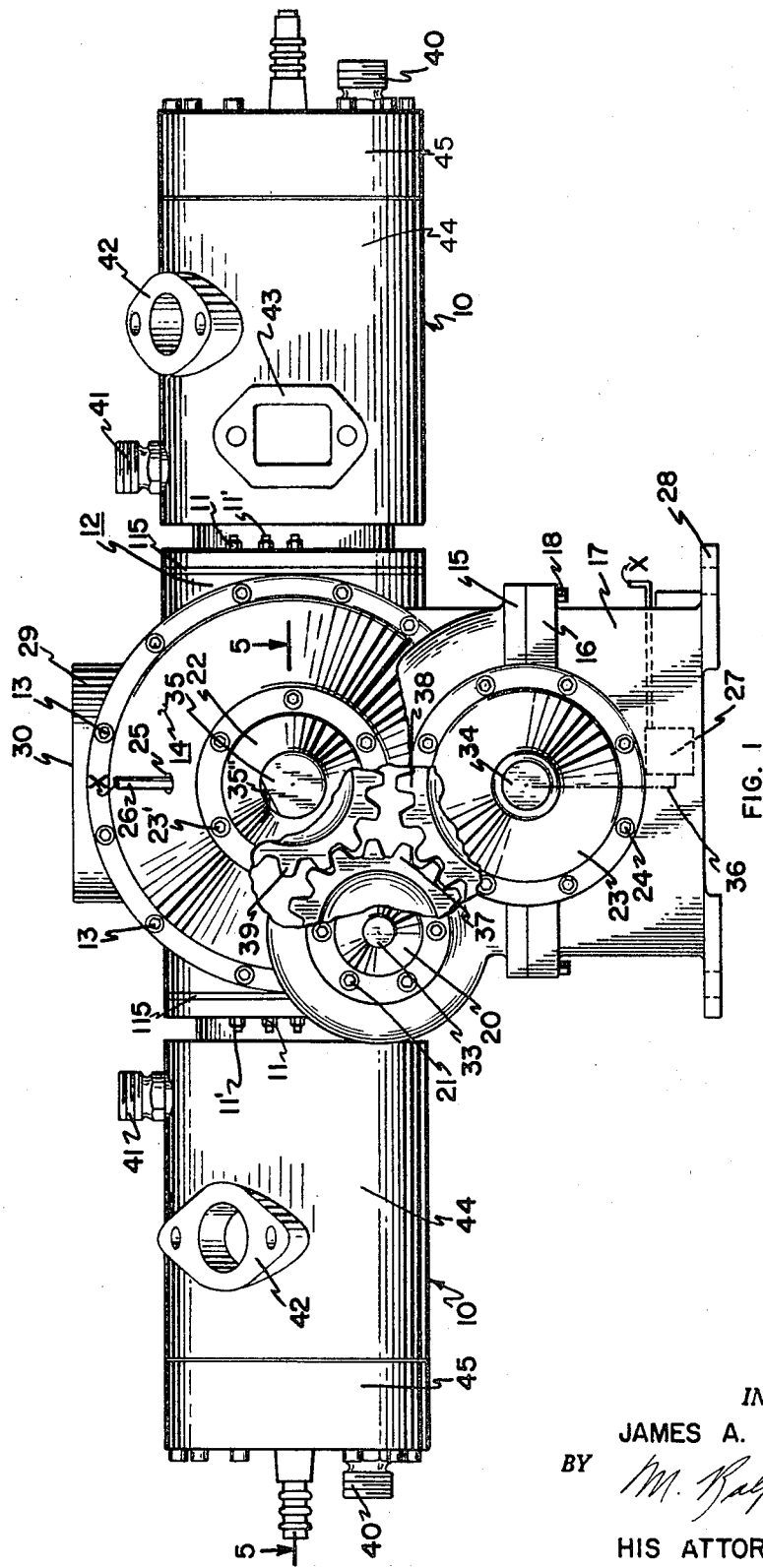
FIGURE 1 is a side elevation of the two cylinder, two cycle opposed piston engine of the present invention.

In FIGURE 1 bearing cover plate 20 is supplied (to cover the idler gear bearings) and is bolted to the rotor carrying end bell 14 by means of cap screws 21. Correspondingly, bearing cover plates 22 are secured to bells 14, 14' by cap screws 23'. And, bearing cover plates 23 are secured as by cap screws 24 to the mounting surfaces of the assembled oil chamber 17 and the rotor carrying end bells 14 and 14'.

As shown in FIGURE 1, the rotor carrying end bells 14 and 14' have admittance apertures 25 through which oil pressure feed lines 26 are inserted. As illustrated, the upper end of each line 26 is broken away; however, it will be understood that the line continues from its upper broken extremity X to the lowermost extremity X on the right hand side of the drawing and connects with a conventional oil pump 27, shown in dotted lines. Pumps 27 are mechanically driven via conventional coupling 36, by a shaft 34 disposed in the oil chamber 17. Extensions 28 are mounting feet for the composite engine structure and are disposed exteriorly of oil chamber 17.

The central, rotor housing 12 includes an upstanding, boss-like structure 29 defining an inspection opening 30 (see also FIGURE 2). Structure 29 includes an inspection plate seat 31 which is chamfered at 32 to receive the inspection plate 72 (removed for clarity in FIGURE 2 but shown in FIGURE 3).

The end 35" of the rotor carrying shaft 35 preferably extends from its associated bearing plate far enough to allow a hand crank (not shown) to be attached thereto. Gears 37, 38 and 39 are fixedly mounted on their respective shafts 33, 34 and 35, with gears 37 and 39 being in mesh and gears 37 and 38 being in mesh, but with gears 38 and 39 being separated. Gear 37 is an idler, rotation reversing gear and gear 38 is the driven gear and gear 39 is the drive gear.

Each of the cylinders 10 can be water-cooled and is therefore supplied with an inlet water connection 40, an outlet water connection 41, two exhaust mounting spacers 42 (one not shown), and an intake mounting spacer 43. The outer cover for each cylinder comprises a cylinder water jacket sleeve 44 and a cylinder head water jacket sleeve 45. The construction and particular cooperation of the two water jacket sleeves will be set forth with particularity hereinafter.

Figure 4:
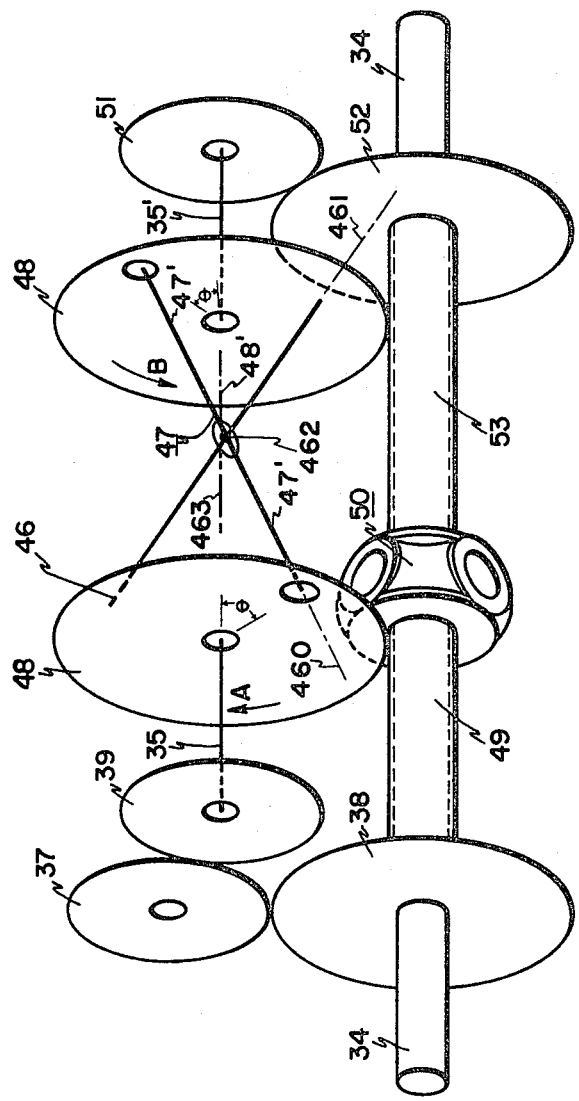
FIGURE 4 is a simplified, schematic diagram indicating the basic principle of operation of the engine, and relates particularly to the means by which the reciprocating motion of the input drive is converted to rotary output power, or vice versa.

In FIGURE 4 the gears 37, 38 and 39 of FIGURE 1 are shown in schematic form as part of the motion transforming mechanism of the invention. The reciprocating piston rod (indicated by line 46) is connected to a shuttle assembly 47 the arms 47' of which are journalled in a pair of rotors 48 that revolve about a common center axis 463. The rotary motion of the left rotor 48 is transmitted through shaft 35 and gears 39, 37 and 38, sleeve 49 and equalizing gear assembly 50 to shaft 34.

Correspondingly, the motion of right hand rotor 48 is transmitted through shaft 35' and gears 51 and 52, sleeve 53 and the equalizing gear assembly 50 to the output shaft 34.

Figure 3:
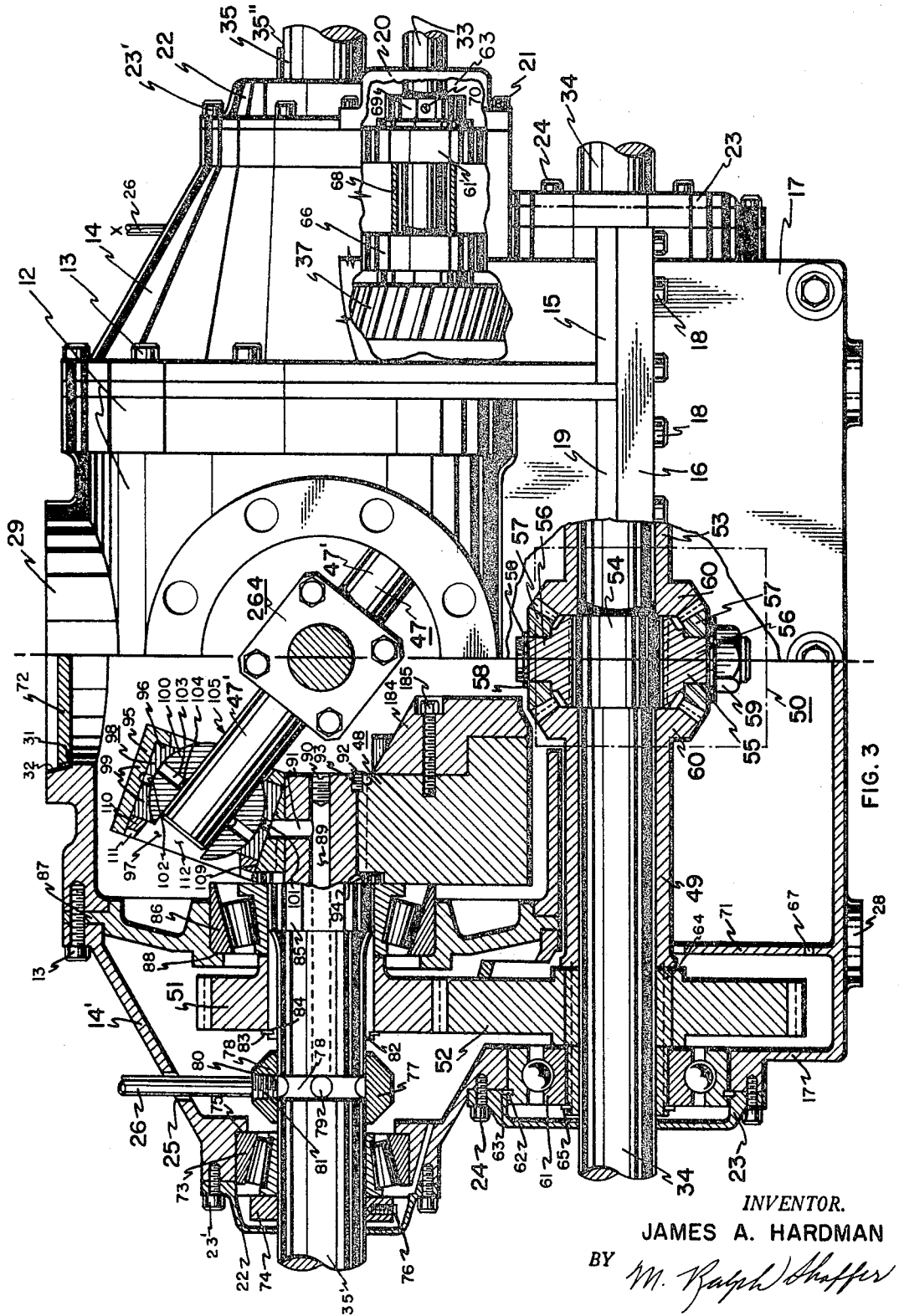
FIGURE 3 is an enlarged view, partially in vertical section, of the principal engine structure and is taken along the line 3—3 in FIGURE 2, the view being in enlarged scale and rotated 90° in a counter-clockwise direction for purposes of clarity.

As best seen in FIGURE 3, output shaft 34 has an enlarged splined central portion 54 upon which is mounted the spider 55 of the equalizing gear assembly 50. Spider 55 carries projections 56 upon which are journalled bevelled planet gears 57, which gears may be secured in place either by appropriate snap rings 58 or by washer and nut attachments 59. The inner ends of sleeves 49 and 53 each include side bevel gear portions 60 which mesh with the planet gears 57 as shown. Rotors 48 revolve oppositely with respect to one another (see arrows A and B, FIGURE 4) and the gear combinations receive power equally from both rotors as they transmit the power to the output shaft 34. Thus it is necessary that the ratio of the pitch diameters between gears 39 and 38 be equal to the ratio of the pitch diameters of gears 51 and 52.

The two rotors are also rotated at equal angular velocities. As a consequence the power is transmitted from the two rotors, to the two drive gears 39 and 51 on their respective rotor shafts 35 and 35'; and then, on one side, through idler gear 37 to gear 38 and on the opposite side directly from gear 51 to 52. Sleeves 49 and 53 will be rotated in the same direction and inasmuch as these sleeves are integral with the side gear portions 60 of the equalizing gear assembly 50, it will be seen that the planet gears 57 will rotate about the projections 56 of the spider 55 until they come into balanced engagement with the two side gear portions, and drive the shaft 34. Conversely if the engine is run under compression with a torque applied to shaft 34, the spider rotating to carry the planet gears with it and gears 57 rotating about projection 55 until the gears 57 apply equal forces to the two side gear portions 60, and thereby delivering equal power to the rotors.

As seen in FIGURE 3, bearing cover plate 20 is secured to the rotor carrying end bell by means of cap screws 21. Bearing 61' is secured by locking ring 69 and the plate 20 is recessed at 63 to receive the locking ring. Fixedly mounted within the rotor end bell 14 are a pair of bearings 66 and 61' which are separated by a sleeve spacer 68 (shown in section). These are retained by shoulders in the housing (not shown) and by locking ring 69 and its set screw 70. Oil chamber 17 has an oil control partition 71 therein. This partition prevents excessive oil turbulence within the oil chamber. A small aperture 67 in the bottom of partition 71 serves as a metering aperture to permit a small flow of lubricant into the vicinity of gear 52.

Sleeve 49 is splined and has a shoulder at 64 to receive gear 52. The inner race of bearing 61 fits on sleeve 49 and is secured by a snap ring 65. Identical structure to that described will be found on the opposite side of shaft 34 in association with sleeve 53.

The structure of the oil pressure feed lines 26 and their connections to shafts 35 and 35' is identical. The shafts 35' and 35 are journalled within the rotor carrying end bells 14' and 14 by bearings 73, and the bearing cover plates 22 are mounted as aforementioned to the respective bells 14 and 14' by means of cap screws 23. A locking ring 74 that positions the bearing 73 against shoulder 75 is secured in place by a set screw 76. Shafts 35' and 35 are provided with an annular recess 78 and with at least one radial bore 79 in communication with the annular recess 78. Oil input ring 77 is provided with a radial bore 80 which is drilled and tapped for the reception of the threaded end 81 of oil pressure feed line 26. A space is provided between the ring 77 and bearing 73 on one side and spline 82 on the other side thereof to allow for easy positioning and mounting of the oil feed lines and oil rings 77 relative to shafts 35 and 35'.

The shafts 35' and 35 are each splined at 82 to respectively accommodate the mounting of gears 39 and 51 and the gears are each held in place by a snap ring 83 fitted into a spline recess 84. Shafts 35 and 35' each have an enlarged medial hub 85 which is journalled in the housing structure by means of a bearing 86 and a bearing retaining plate 87. The plate 87 is shouldered at 88 to receive bearing 86 and is secured in place, as illustrated in FIGURE 3, by the cap screws 13.

An axial bore 89 which is closed at the shuttle area by set screw 90, connects with radial aperture 79 and is in registry with other structure through a radial bore 91 communicating therewith. Each of the rotors 48 is keyed at 92 to one of the shafts 35' and 35, and a set screw 93 is threaded into the juncture of the two parts to fix the rotors 48 on their respective shafts and against translational movement. Enlarged shoulder portions 94 allows the respective rotor end bearings 86 to be positioned. A portion 95 of each rotor 48 is bored to supply a bearing shoulder or seat 96. Disposed within the so formed bore is a spherical bearing 98 which includes a pair of contoured bearing rings 99 and a ball 100. Bearing rings 99 are chamfered at their inner edges 102 and are supplied with cooperating radial apertures 101.

As best seen in FIGURE 5, a plurality of the radial apertures 101 are provided at the mutual juncture of the two bearing rings 99. A number of apertures are used to insure adequate oil distribution. The chamfered edges 102 supply a circumferential runway for oil about the ball 100. Ball 100 is supplied with a plurality of radial apertures 103 which terminate in an inner continuous groove that surrounds the shuttle assembly 47. The shuttle assembly 47 includes a shuttle member 105 having arms 47' that are each provided with an external longitudinal slot 106 that is in communication with groove 104. This communication is maintained regardless of the position of the shuttle. As shown, the shuttle is at one of its extremities of travel. Also in registry with slot 106 is an aperture 107 that leads into the interior of shuttle member 105. Thus, there is a direct supply from the oil pressure feed line 26 through shaft 35', portion 95 of rotor 48, the spherical bearing structure 98 and into shuttle member 105. The opposite ends of shuttle member 105 are supplied with freeze plugs 108 or with suitable other structure that will close the ends of the shuttle assembly 47.

The spherical bearings 98 on both arms 47' of the shuttle assembly 47 are secured by threading bore 97 at 109 and threading a spanner nut 110 therein. Open areas 111 indicate spanner wrench recesses. If desired, relief aperture 112 of housing portion 95 may be conically configured outwardly to provide for the movement of the shuttle assembly 47.

The interior of shuttle member 105 is preferably bored out at 47" to reduce the weight of the shuttle. The pistons can also be cooled with a forced lubricant, the interior opening 47" of the shuttle member then serving as a lubricant passageway to the hollow piston rods 46. This is best shown in FIGURE 5.

The piston and piston rod construction for each of the two cylinders employed is identical in construction, so only one side is shown, fragmentarily, in FIGURE 5. Radial threaded bores 113 are formed at opposite sides of shuttle member 105 to receive the threaded ends of piston oil feed lines 114.

A pair of stuffing gland base plates 115, each disposed on one side of the principal or rotor housing 12, are referenced in FIGURES 1, 2, 5 and a representative one of which is shown more in detail in cross section, in FIGURE 18. As shown in FIGURE 18 studs 11' are threaded into the housing 12 and are provided with nuts 11 which retain both the respective stuffing gland base plate 115 and also flange 232 of cylinder 10. As best seen in FIGURE 5, cap screws 117 secure stuffing gland 118 to the base plate 115. The stuffing gland 118 may be fabricated from aluminum, cast iron or other material, and is employed to journal a spherical bearing 119 that is held against a shoulder 120 by a retaining ring 121 that is seated within recess 122 of base plate 115. Space 123, in FIGURE 5, designates a piston skirt clearance area. An L-fitting 124 is threaded into base plate 115 at 125 and extends into a bore area 126, that is in communication with a radial bore 127. Two outer bearing rings 128 of the bearing 119 seat on the shoulder 120 and, like the bearing rings 99 of bearing 98, are supplied with at least one but preferably a plurality of radial apertures 129 and with an annular groove 130 defined by the chamfered edges of the bearing rings. The ball 131 of bearing 119 is likewise provided with at least one but preferably a plurality of radial bores 131' which communicate with an interior, annular groove 132. The spherical bearing structure of FIGURE 5, employed to journal the piston rod within the stuffing gland is preferred, but that shown in FIGURE 15 may be used without departing from the context of the present invention. In FIGURE 5 the bearing 119 controls the piston rod 46 and has the responsibility of equalizing the forces which come to the piston rod from the rotors 48 so that temporary radial stresses may be picked up on this spherical bearing. If bearing 119 is to carry a load it is necessary that it be lubricated and, if it is lubricated, then it must have a close fit or the lubricating pressure at the rest of the bearings in the system will be reduced. It has been found that stress and yield in the push rod when the rod is light (as it must be to perform its proper function) tends to wear bell mouthed a rigidly mounted bearing. Heretofore, attempts have been made to use a rigidly mounted bearing on the push rod but this has not worked satisfactorily. When the bearing bore is tight enough to control the oil flow and prevent excessive loss along the edges of the bore, the bearing invariably binds as a result of flexure of the push rod and until the bearing is worn out into a bell-mouth shape it will not run free again. This wear problem has been substantially eliminated by use of the spherical bearing 119 that swivels to align itself with the reciprocating shaft. Bore clearance can thus be held within proper limits to avoid excessive loss of oil and oil pressure.

Phantom line 133 indicates the fluid connection between L-fitting 124 and the oil pump 27 shown in FIGURE 1.

One type of stuffing gland is illustrated in FIGURES 5 and 18. The stuffing gland 118 is composed of two parts 118A and 118B, held together by cap screws 118', FIGURE 18. Mechanical, spring bound, oil wiper rings 134 and compression rings 135 are held apart by a spacer 136 that is held in position by spacers 137 and 138. The space 139 formed by spacer 136 serves as an oil collecting chamber through which oil, "scraped off" the piston rod by the rings 134, is diverted through channels 140 and 141. It will be noted that annular open spaces between the two sets of rings and their corresponding spacers or sleeves allow the rings to float on the piston rod. The compression rings 135 and the oil rings 134 are conventional and comprise segmented rings girthed by respective garter springs.

The stuffing gland member 118 extends into the piston cylinder and into the piston during the firing stroke of the engine. As will be further explained, the rotating and reciprocating skirt of the piston provides port valving such that the volume below the piston crown is displaced by the stuffing gland. This results in a pumping from below the piston to effect scavenging and recharging of the area above the piston.

Piston rod 46 is a stepped hollow shaft having a middle portion 142 of relatively large outside diameter and end portions 143 of relatively smaller diameter. This variable size construction is preferred since a rod of small size is preferred at the connection with the pistons thereby providing a maximum displacement area at the bottom of the piston, while a rod of large size is desired to pass through the spherical guide bearings, where wear is more apt to develop.

The outer end of piston rod 46 is exteriorly splined at 144 and interiorly threaded at 145. A shoulder 146 is provided as a seat for the lower end of a piston mounting flange 147 that is splined to the piston rod. Retaining lug 148 is threaded into the outer end of the piston rod at 145. The retaining lug has a conical seat 149 which receives a centering nut 150 that is threaded onto the outer end of oil line 114. The underside of the head of lug 148 is grooved at 151 to provide oil return passages in communication with a port 152 that allows oil return from the head of the piston, through piston rod 46, on the outside of oil feed line 114.

Oil flow is from the shuttle member 105, through oil feed line 114 to piston head cavity 153, through grooves 151 in lug 148, through the annular space 152, down through the hollow piston rod 46 exteriorly of feed line 114 and through spring loaded relief valve 154 shown in FIGURE 6.

As shown in FIGURE 6 the piston rod 46 is provided with an enlarged medial portion 155 that receives the shuttle 47. The piston rod is also bored and tapped at 156 to receive the spring loaded relief valve 154. Bore 156 is disposed in communicaiton with a surface oil groove 157 of the shuttle member 105 so that returning oil inside of piston rod 46 but outside of oil return line 114 flows into the recessed area 157 and to the rotor housing of the engine through the spring loaded valve 154.

At the left-hand side of FIGURE 5 the usual piston rings 160 and piston skirt 161 are illustrated. The rings can be pinned to the piston, for example by pin means threaded into the piston ring recesses or lands 160'. The pins must be placed such that the pins and ring ends will not pass over a port area to inadvertently catch in the port holes. Because of the rotational movement of the piston and rings throughout the piston stroke little, if any, ring end wear will occur on the ring pins.

Piston mounting flange 147 has an annular recess 163 on its upper surface to accommodate a rubber O-ring 164, which serves an oil seal or gasket function. The piston mounting flange is secured to the piston 159, as shown on the left-hand side of FIGURE 5.

In FIGURE 7 the cross-sectional construction of the piston 159 is shown. FIGURE 8 is a view taken along the line 8—8 in FIGURE 7 and shows the inner contour of the piston 159. Three, or more, lug receiving recesses 165 are used for centering purposes as well as to insure an integral locking relationship between the piston mounting flange 147 and the piston rod 46. This relationship is shown in FIGS. 5, 7 and 8.

The piston mounting flange 147 includes peripheral flange lugs 170, shown in dotted line configuration in FIGURE 5 and are similar to structure shown in FIGURE 11, hereinafter to be described. The flange lugs are inserted into the recesses 165, illustrated in FIGURES 7 and 8, and keeper lugs 167, FIGURES 9 and 5 are held in place by a snap ring 168. In some instances the piston rod may be slightly modified, as shown in FIGURES 10, 11 and 12, to include a flange 169 which is integral with the rest of the rod structure. A plurality of threaded holes 172 are formed in an oil line 114' of FIGURE 13 that is similar to oil line 114 herebefore described, and are secured by the screws 115 shown in FIGURE 12. Keeper lugs 167 are again provided to cooperate with a locking snap ring 168. Oil feed line 114' also includes spanner wrench recesses 172 and oil return recesses 173.

Another embodiment of the piston of the invention is shown at 159' in FIGURE 29. This configuration differs from that formerly described in that the underside of the head of the piston has a key-way slot 174 therein. This can also be seen in FIGURES 15, 17 and 31. Key-way slot 174 receives the key-type lug protuberances 175 (in FIGURE 17) associated with flange 176 of the alternate piston rod 177. Threaded apertures 178 are supplied, as shown in FIGURE 17, to receive cap screws (not shown) inserted through apertures 178 in the crown of the piston, as seen in FIGURE 31, to mount the flange 176 to the piston.

The present engine is substantially vibration free and the lack of vibration is largely attributable to the incorporation of counterweights 184 which are secured to the rotors 48 by means of flush machine screws 185, as shown in FIGURE 3. Any undesired, off-center inertia forces present may be counterbalanced by suitably designed employment of the counterweights 184 and the counterweights can thus be used to positively position the center of mass of the rotors and reciprocating assembly at the axis 48' of the shafts 35, 35'.

As shown in FIGURE 15 the oil is supplied to the piston rod control bearing in substantially the same manner as it is supplied to the spherical bearing 119 of FIGURE 5. The oil supply system includes an oil feed line 133 threaded into a radial aperture 186 of a bronze bushing 187. The bushing is of split type and is dowel pinned and bolted together similar to the embedment of stuffing gland shown at 190. A plurality of annular interior recesses 188 serve as lubricant conduction grooves. The stuffing gland mounting plate 115 is secured by cap screws 189 to each of the two identical halves of stuffing gland 190. The two halves, 191, include dowel pin holes 192 and dowel pins 192' for preliminarily positioning the two halves prior to the insertion of tangent bolts (not shown) into the drilled and tapped holes 193. The two halves of the stuffing gland 190 also include conventional compression seals 194, and oil wiping seals 195, like those previously explained.

As disclosed in FIGURE 15 the stuffing gland may be composed of two identical halves, with the enlarged portion of the representative piston rod 177 slidably journalled within the lubricated bronze bushing 187. Channel 196 is an oil return channel which feeds back into the main (rotor) housing 12 of the engine. Aligned apertures 197 of housing 12, plate 115, and cylinder 10 accommodate the threaded studs and nuts 11' and 11, not shown in FIGURE 15. In FIGURE 15 the cylinder 10 is an air-cooled cylinder sleeve 198' having a multiplicity of annular fins 198. The cylinder head 199 is secured to the cylinder assembly by conventional machine bolts 200.

A water cooled cylinder 10 is illustrated in FIGURE 18. The cylinder sleeve 201 is secured to the housing in the manner previously described and a cylinder head assembly 203 is attached thereto by machine bolts 202.

The cylinder head assembly 203 comprises a cylinder head jacket 204, a uniquely configured, two-halved, composite flow control vane 205, and spreader spacers 206 and 207 which uniquely space the flow control vane 205 between the upper and lower portions of the cylinder head jacket 204. Jacket 204 also includes a central threaded seat 211 for an engine spark plug 212 and a threaded, inlet water port 213.

The cylinder also includes the cylinder water jacket sleeve 44 and the cylinder head, water jacket sleeve 45 shown also in FIGURE 1. As shown in FIGURE 18 recesses 214 and 215 and O-rings 216 and 217 therein secure the placement and seal of the water jacket sleeve 44. Correspondingly, O-rings 218 in recesses 219 provide seals between the cylinder head jacket 204 and water jacket sleeve 45.

Coolant water circulated through the cylinder assembly enters orifice 213 of the cylinder head jacket 204, traverses a path in the direction of arrows A through flanges 220 and 221 of the cylinder head jacket 204 and water jacket sleeve 45 to enter the annular cylinder water jacket area 222, and out the outlet port 223.

The open areas 224, 225 and 226 between the cylinder head jacket 204 and the flow control vane 205 are dimensioned to be equal in cross sectional area; hence, the relative sizes and shapes of the cylinder head jacket 204 and flow control vane 205 are selected accordingly. Since flow will be unobstructed hot spots (or "steam" spots) will be avoided and heat at the cylinder head will be satisfactorily dissipated.

Half of the upper portion 227 of the cylinder head jacket 204 is shown in FIGURE 21 with apertures 228 arranged to receive bolts 202. Similarly, FIGURE 22 shows one of two identical half portions of the lower portion 229 of cylinder head jacket 204. In addition to bolt apertures 228 there are provided a plurality of water conduit apertures 230. For optimum heat transfer the sum area of apertures 230 at least equals the areas at 224, 225, and 226.

FIGURES 19 and 20 illustrate one configuration of the flow control vane 205, wherein it is formed in two adjacent, contacting, coplanarly positioned halves. As shown, the flow control vane 205 is constructed so as to insure a uniform flow pattern of the coolant liquid and includes a central aperture 231 which forms a metering vane for the liquid. The cross-hatched apertures in FIGURES 20, 21 and 22 represent holes through which the mounting bolts 202 are inserted.

FIGURE 23 is an elevation view of the cylinder wall or sleeve 201 more clearly showing the base mounting flange 232 of the cylinder wall or sleeve. The recessed areas 214 and 215 for O-rings are shown, along with exhaust port bosses 233 having O-ring recesses 234 and threaded mounting holes 235. A mounting boss 236 for the intake includes a pair of threaded apertures 237.

FIGURE 24 is a fragmentary roll out view of the inside wall of cylinder sleeve 201, with exhaust ports 238 and 239, intake port 240 and bypass port 241 being shown.

FIGURE 25 illustrates one form of water jacket sleeve (see FIGURE 1) in which the outlet fitting 223, the intake admittance aperture 242, and exhaust admittance aperture 243, together with their respective mounting bolt admittances 244 and 245, are shown. Jacket 45, FIGURE 18, is simply an unapertured cylinder section.

As seen in FIGURE 24, the intake port 240, of cylinder 201, and bypass port 241 include protruding fingers 245 and 246, respectively. The fingers 245 and 246 prevent inadvertent catching of the piston rings on the port edges.

The width of the bypass port 241 in substantially greater from extreme opposite sides than the corresponding sweep thereof of the piston, and is substantially equal to the width of the two exhaust ports 238 and 239, plus the width of finger 246. Thus, a layout portrayal can demonstrate that the amount of available sweep of the piston over the cylinder wall will be less than the combined width across the two compartments of the bypass ports plus the finger 246. Since the exhaust ports must be opened and closed during the bottom third of the downstroke of the piston, the exhaust ports will have to be separated so that the sweep of each piston exhaust channel can completely open and close its associated wall port independently of the other, albeit simultaneously.

In FIGURES 18, 23, and 25 it can be seen that the water jacket area extends past the various ports and beyond the stuffing gland assembly 118. Thus heat resulting from compression of the volume beneath the piston during back-stroke is drawn away from the lower part of the cylinder area. A considerable amount of air pressure can be created on the downstroke of the piston even though there is a corresponding increase in heat produced by such pressure, since the heat is quickly and safely dissipated. It is, therefore, possible to accomplish optimum pumping over a wide range of speeds.

FIGURE 26 is a top view of the cylinder 10, with the water jacket installed. The exhaust mounting pads 42 are illustrated, and the intake pad 43 is also shown, together with the intake manifold 247, coupled as shown to both cylinders and to carburetor means 247'. The parts are exploded relative to the central assembly for clarity. The dotted line configuration illustrates, in general, port contour and mounting bolt locations. FIGURES 27 and 28 show the bypass port area of the cylinder and particularly the scalloped bypass port cover 248 which is secured in place by screws 249. The scallops in cover 248 insure water circulation in proximity with the bypass port 246, FIGURE 28A.

For some uses, the engine of the invention is positioned such that the axes of the piston rod and pistons lie in a horizontal plane, and hereafter it will be assumed that the engine is in such a position. As so arranged, the pistons not only reciprocate back and forth within their respective cylinders but also rotate about their common axis. Thus, there will be an imaginary line on the outside surface of each piston which will be on the top of the piston skirt when the piston reaches its top dead center position, i.e. when the piston is at its outermost limit of travel. This imaginary "uppermost line" is identified as TDC, i.e. the "top dead center" line of FIGURE 32.

Each piston will have such an imaginary TDC line.

In FIGURES 32–40 a TDC line of the piston is illustrated by the line or arrow so labeled. There is also a corresponding, common reference line CRL which is an imaginary line on the inner wall of the cooperating cylinder and which is coincident with the TDC line when the pistons are in their respective top dead center positions. Thus, the cylinder common reference line CRL for each cylinder will be a longitudinal horizontal line lying uppermost on the inner surface of the cylinder which is uppermost with respect to all other portions of the inner wall of the cylinder. In summary, the CRL line of each cylinder is fixed whereas the TDC line at each piston revolves in accordance with the movement of the piston.

FIGURE 30 represents a plan view of the piston 159 (piston 159' FIGURE 29, being an alternative embodiment having a slot 174 as before explained). The piston crown 158 of either piston 159 or piston 159' has a flat bottomed conical recess 251 therein. The crown 158 of the piston is relatively deep, with channels 252 and 253 and a scavenging recess 257 cut into its side. Because of piston crown configurement, it is essential, to preserve compression ratio, that the top dead center of the piston be nearer to the cylinder head than it is conventionally. Thus, the conical recess is placed in the top of the piston crown to receive the points of a spark plug and to collect the fuel at the spark plug. It also provides a funneling effect for the exhaust gases when the exhaust ports open. The side channels 252 and 253 start at the bottom of the conical recess 251 and protrude outwardly and downwardly to the vicinity of the piston rings. The exhaust conducting channels 252 and 253 define the only unswept areas remaining in the firing cylinder when the exhaust ports are closed and these channels are the first to be exhausted when the exhaust ports are again opened. Thus, an absolute minimum of unexpelled gases will remain in the cylinder. It has been found, that with the piston near the top of the cylinder at the end of its stroke, desired compression ratios can be obtained even though the piston crown is deep and exhaust channels and recess are formed in the crown.

Each of the exhaust channels 252 and 253 have two, downwardly stepped declining portions 254 and 255 which are contiguous and which lead in their combination to the outer periphery of the piston. The two declining portions 254 and 255 of the channels permit the retention of sufficient metal between these surfaces and the push rod flange seat on the underside of the piston crown to preserve wall strength. Surfaces 256 form inclined sidewalls of the two channels 252 and 253 that are suitably configured to be compatible with the configuration of the two exhaust ports. The depth of the crown, i.e. the distance between the top ring of the piston and the top of the piston crown, accommodates the sleeve porting in the cylinder wall as hereinafter described. The scavenging recess 257 is positioned as shown in FIGURES 30 and 32 and is also referenced in FIGURE 29. It will be seen that the scavenging recess 257 is in an area generally opposite the exhaust channel combination 252, 253.

Exhaust channels 252 and 253 communicate directly with the conical recess 251 and are downwardly configured to conduct exhaust products to the exhaust ports of the cylinder. The scavenging recess 257 is positioned substantially opposite to the exhaust channels 252 and 253 and serves a multiplicity of purposes. The scavenging recess 257 registers with the discharge portion of the bypass port, at the bottom portion of the stroke to admit a fuel and air mixture from the underside of the piston crown into the firing chamber. The scavenging recess 257 admits the mixture above the piston rings and serves as a deflector to urge the mixture in a sweeping motion up the back wall of the cylinder. This forces combustion products from the cylinder when the piston exhaust channels 252 and 253 register with the cylinder exhaust ports 238 and 239. Fuel-air mixture beneath the piston is thus forced from this area under its own pressure and nearly complete displacement is obtained. It is therefore possible to accomplish this transfer of fuel-air mixture through a port of relatively small size and relatively short circumferential length, thereby leaving intact large area segments of the crown between recess 259 and the exhaust channels 252 and 253. Loss of fresh fuel and air mixture out the exhaust ports 238 and 239 is avoided.

In FIGURE 32 it can be seen that a plurality of intake passages 258, 259 and 260 are preferably provided through the piston skirt, instead of just one which might cause distortion of the piston skirt during engine operation. The positions of passages 258, 259 and 260 are chosen so that there will be a sequential registration of these ports with the fuel intake port of the cylinder during the compression and intake stroke. During power and exhaust stroke the skirt 161 of the piston 159 must seal off the exhaust ports 238 and 239 of the cylinder; hence, the sleeve of the piston acts as a sleeve valve and must fit as close within the cylinder as is compatible with the operating temperatures and the performance requirements. Thus, it is preferable, that piston 159 include a heat barrier 305 formed by a buffer recess 306 and preferably followed with a thickened annular wall ring 307.

The particular size of the openings of ports 258, 259 and 260 will be chosen in accordance with engine requirements. Bypass port 241, FIGURE 24, of each cylinder 201 is disposed on the bottom side of its respective cylinder, so that fuel condensations which naturally settle to the bottom of the cylinders will be swept into the firing chamber during each back stroke, as a revaporized liquid, mechanically extrained in the pressurized fuel-air mixturee moved into the firing chamber. It should be apparent therefore that the piston ports 258, 259 and 260 must be disposed near the TDC line. Port openings 258, 259 and 260 are positioned to sequentially pass over the bypass port 241 of the cylinder 201 during the downstroke of the piston so as to conserve wall area of the piston and cylinder, and thereby insure maximum remoteness of the exhaust ports from the upper portion or intake portion of the bypass port. The lateral positions of the port openings 258, 259 and 260, however, may be varied somewhat in accordance with the particular disposition chosen for the bypass opening.

Figure 33:
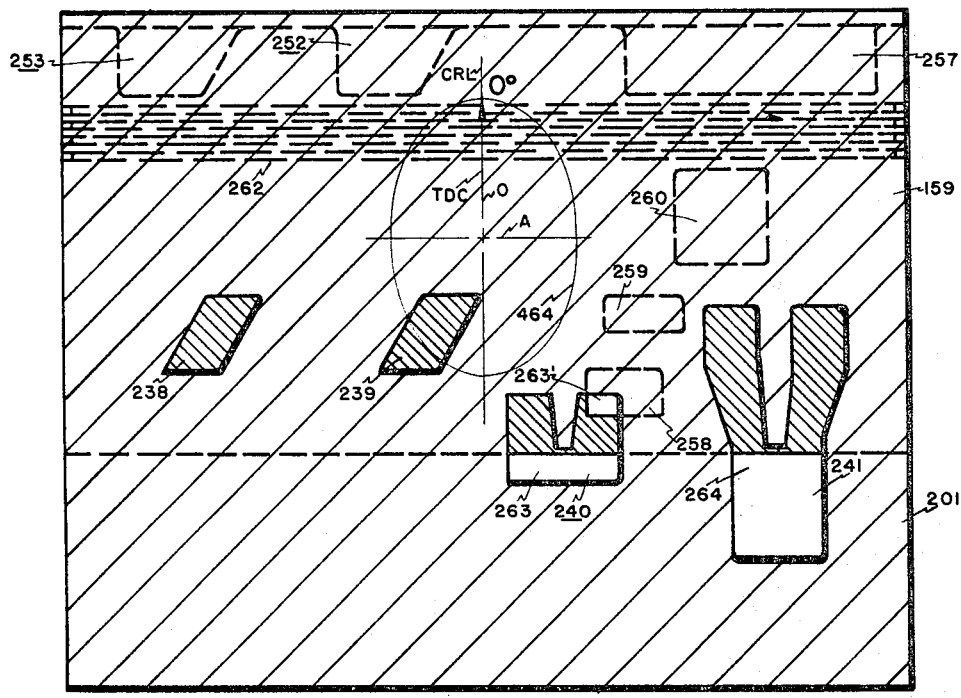

The piston cylinder diagrams, FIGURES 33–40 each depict a rollout of a representative engine cylinder 201, shown for convenience of illustration as a rectangle having widely spaced section lines, superimposed over a rollout of the respective piston 159, shown as a dotted line rectangle. The figures illustrate the relative surface locations of the several cylinder ports, with respect to the several piston openings, through the pistons 360° operating cycle. Numeral 262 designates the ring area of the piston, as shown in FIGURE 33, by way of illustration. The common reference lines CRL in the various drawings indicate the longitudinal top center lines of the cylinder. Correspondingly, the TDC lines of the diagrams, having respective arrow head terminations as previously described, represent top dead center lines of the pistons. Since the cylinders are stationary, the CRL lines will be stationary; however, as the piston revolves during its full stroke the TDC lines will move about the piston rod axis as indicated by the TDC, arrow headed lines of the drawings. At top dead center piston disposition, the TDC lines and theirr espective CRL lines will be proximate to each other, the small distance therebetween being the space between the piston and cylinder. In the diagrams, these lines will appear superimposed.

Cylinder ports 238–241 remain fixed and the piston 159, including piston skirt intake openings 258, 259 and 260 move with respect thereto. In the diagrams, the short spaced lines enclosed within the cylinder port areas 238, 239, 240 and 241 indicate those portions of the port areas which are blocked by the solid wall area of the piston skirt. The blank open areas of ports 238, 239, 240 and 241 of the cylinder illustrate those portions of the port areas which are not covered by the solid areas of the piston since they are in registry with the piston openings 258, 260, 252, 253 and 257.

In FIGURE 33 the piston is in its top dead center position with respect to its cylinder. Accordingly, the cylinder exhaust ports 238 and 239 are closed. Cylinder intake port 240 is partially in registry at 263′ with one of the piston intake apertures 258, as well as being open at 263 below bottom of the skirt of piston 159. Bypass port 241 is partially closed by the piston, with the bottom portion 264 thereof below the bottom of the piston skirt being open.

As previously disclosed and shown in FIGURES 27 and 28, cylinder bypass port 241 may be formed by the plate 248 and the cylinder wall. Thus, the bypass port 241 constitutes a bypass channel serving as a conduit from an area beneath the piston or at a skirt opening thereof to the area above the piston, when the piston is near the bottom of the stroke.

Thus, as shown in FIGURE 33, with the piston at zero degrees (piston top dead center position) the cylinder bypass aperture 241 does not connect with any port or with the area associated with or above the crown of the piston. Registration area 263′, in combination with open area 263 of cylinder intake port 240, conducts fuel-air mixture into the interior area of the skirt of the piston as the piston begins its back-stroke. The cylinder ports 238 and 239 are closed, as are the piston apertures 259 and 260 and piston crown channels 252, 253 and recess 257. The closing of the cylinder intake port 240 is delayed to permit a lag in the closing time of the intake port 240 to assure a full charge of fuel-air mixture beneath the piston crown. The length of the piston skirt and the position of port 240 and aperture 258 may be determined to achieve the lag and consequential performance desired. As shown, the lag is arranged to be 33° and in FIGURE 34 the cylinder intake port 240 is shown completely closed by the piston skirt as it descends during the normal course of piston travel.

At the 33° piston position the area below the piston crown is under compression, with cylinder exhaust ports 238 and 239 and intake port 240 closed by the piston skirt, and with the bypass port 241 continuing to be ineffective. The piston crown channels 253 and 252 and the bypass recess 257 remain closed by the cylinder wall.

Figure 35:
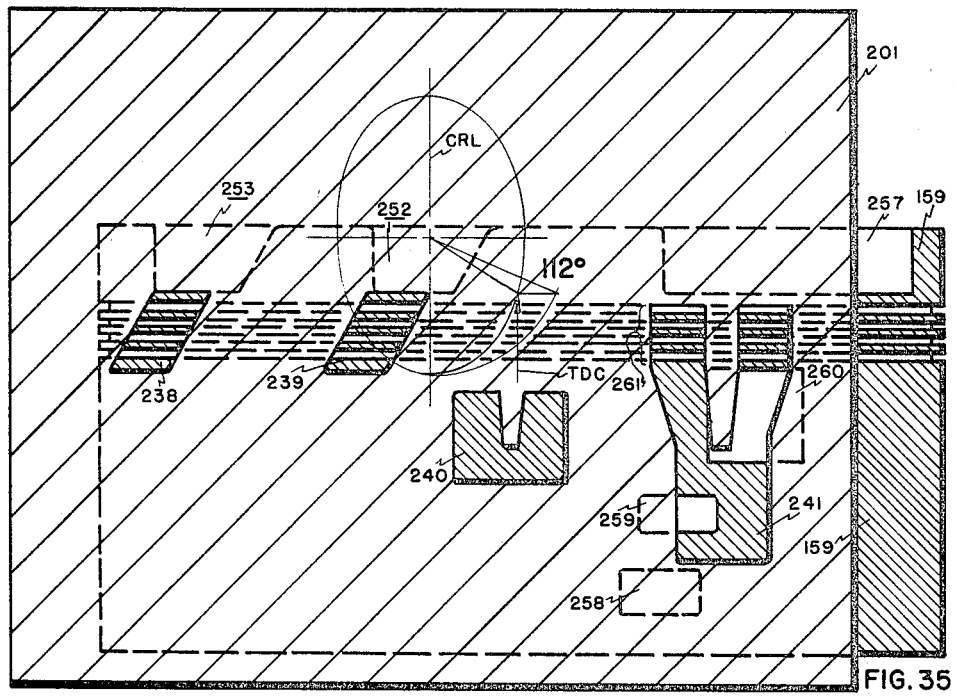

The piston 159 continues its downward travel to the position shown in FIGURE 35 and the exhaust ports 238 and 239 start to open, as they come into registry with the piston crown exhaust channels 252 and 253. Cylinder intake port 240 is closed by the piston skirt and the cylinder bypass port 241 continues to be ineffective since the registering openings 259 and 260 associated therewith simply lead into the interior of the piston skirt.

The piston crown exhaust channels 252 and 253 are wider than the cylinder exhaust ports 238 and 239 and the right-hand sides of the two aforementioned channels are inclined to coincide with the inclined right sides of the ports 238 and 239 so that the outlet channel areas will accommodate the full area of ports 238 and 239 during their further traverse across these channel areas.

In FIGURE 35 it can be seen that at the 112° position of piston travel the cylinder intake port is still closed by the piston skirt and the bypass port 241 continues to be inoperative.

Figure 36:
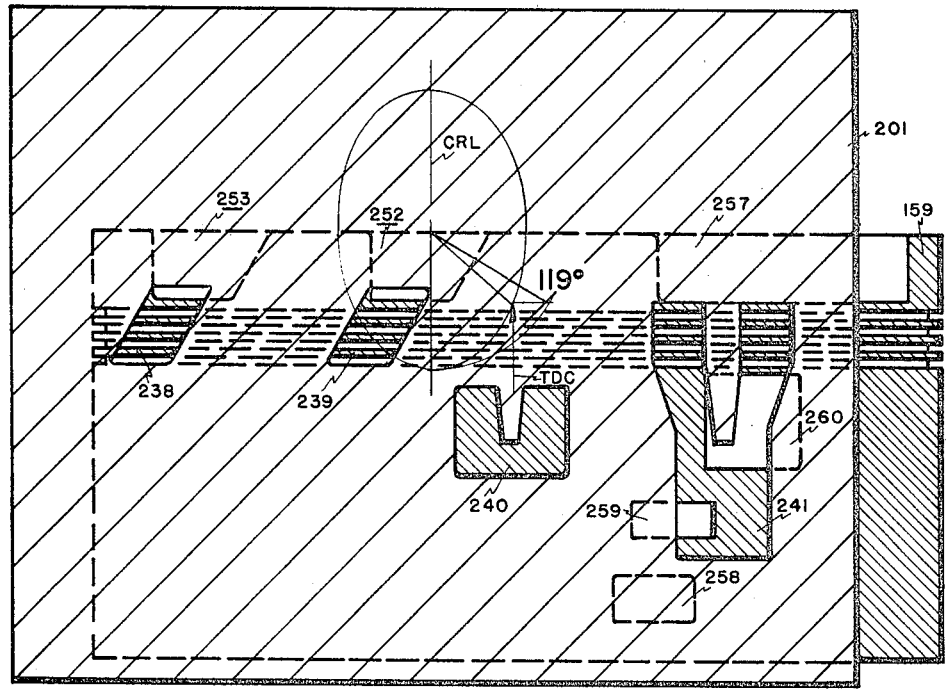

FIGURE 36 illustrates the intercooperation of the cylinder ports and piston openings at the 119° piston position. In this position the piston crown exhaust channels 252 and 253 have begun to move into alignment with exhaust ports 238 and 239, to achieve exhaust lead time preparatory to the introduction of the fuel-air mixture at the opposite wall. Intake opening 240 remains closed. However, at the 119° position the piston crown bypass recess 257 is almost moved into alignment with cylinder bypass port 241, to introduce the fuel-air mixture into the firing chamber.

Figure 37:
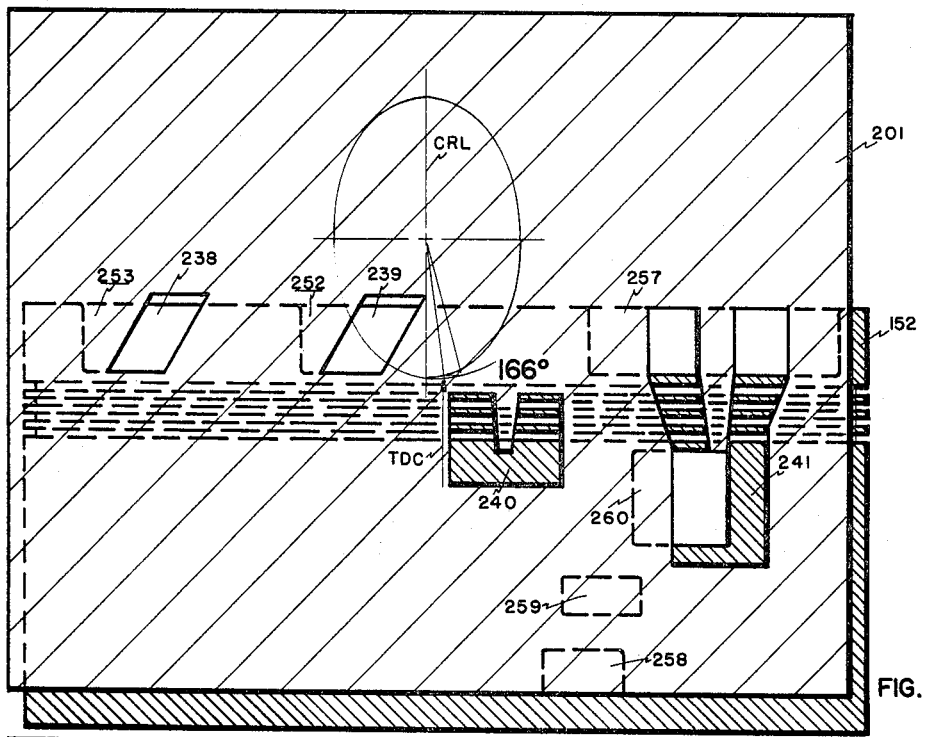

Continued downward movement of the piston 159 respect to the cylinder 201 places the piston crown bypass recess 257 in registry with the upper portion of bypass port 241, as shown, for example, in FIGURE 37. At this time the cylinder exhaust ports 238 and 239 overlap the piston crown exhaust channels 252 and 253, so that the exhaust ports are "wide open." The fuel-air mixture, which is placed under compression as the piston moves from its top position down to the 119° position, achieves a pressure of, for example, four atmospheres, depending upon the piston cylinder design involved, so that the fuel-air mixture upon passing the 119° position suddenly rushes from the interior of the piston skirt through piston aperture 260, bypass port 241, into the piston crown scavenging recess 257 and upwardly adjacent to the cylinder wall opposite the exhaust ports to sweep therearound. This pressurized fuel-air mixture forces exhaust vapors and combustion products of firing from the firing chamber through the exhaust channels 253 and 252, and cylinder exhaust ports 238 and 239 to the outside. At the same time, the pressurized fuel-air mixture fills the chamber for the subsequent upward compression stroke of the piston which starts at the 180° position of the piston.

Figure 38:
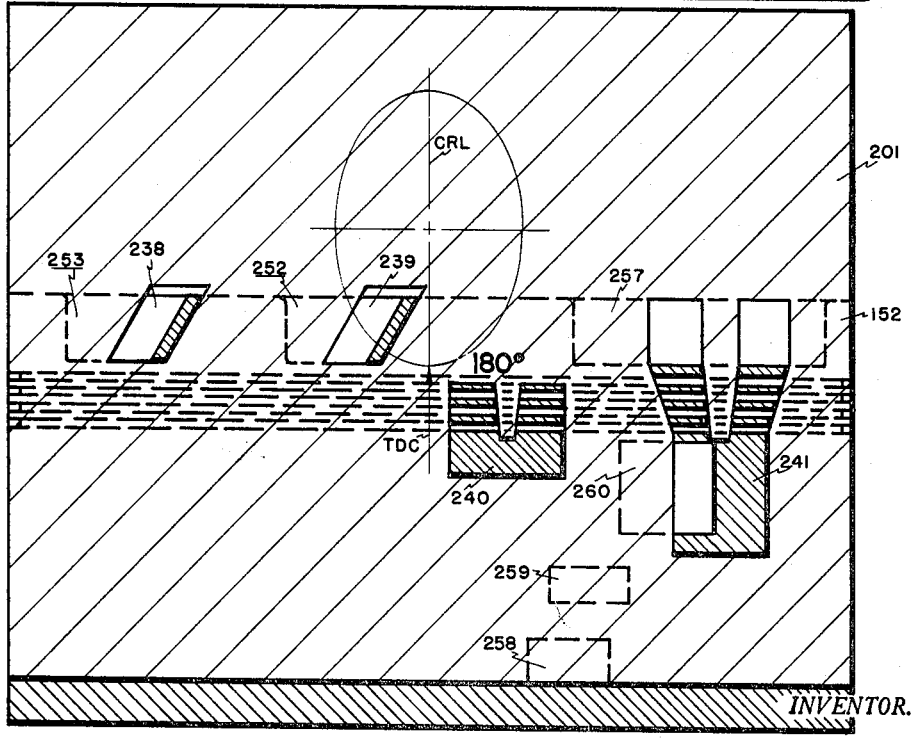

FIGURE 38 illustrates the 180° position wherein the cylinder exhaust ports 238 and 239 are again slightly blocked the cylinder intake port 240 is closed, and the bypass port 241 provides a flow path between regions above and below the crown of the piston, i.e. through piston skirt aperture 260 and the piston crown scavenging recess 257. In FIGURE 38, at the 180° position, the piston pumping function has stopped, and the cylinder enters a settling state since the exhaust ports are substantially wide open, the bypass port provides adequate passage for the transfer of residual compressed fuel to the firing chamber, and axial piston travel, after first slowing, has finally stopped at the bottom of the piston stroke. However, the rotative motion of the piston is at its maximum velocity at 180°, and this rapidly moves the piston to its 205° position, abruptly closing the exhaust ports in preparation for a substantially full compression stroke.

Figure 39:
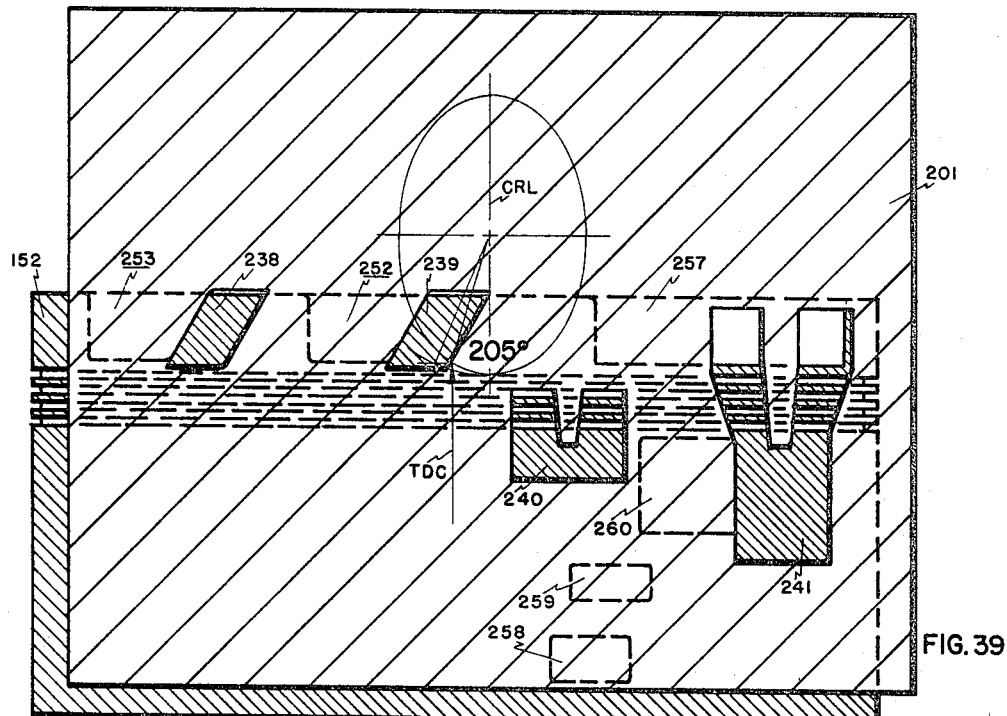

FIGURE 39 shows the piston in the 205° position and traveling upwardly to effect compression within the firing chamber. The exhaust ports 238 and 239 are closed by the piston crown and the fuel intake port of cylinder 240 is also closed. Bypass port 241 is closed off and no longer provides a communication path between the areas above and below the piston crown during compression. It should be noted that sufficient space must exist between piston intake passage 260 and cylinder ports 240 and 241 so that at least a few degrees (e.g. 11°) of closed time of passage 260 will exist, to prevent feedback from the firing chamber through the intake port.

Figure 34:
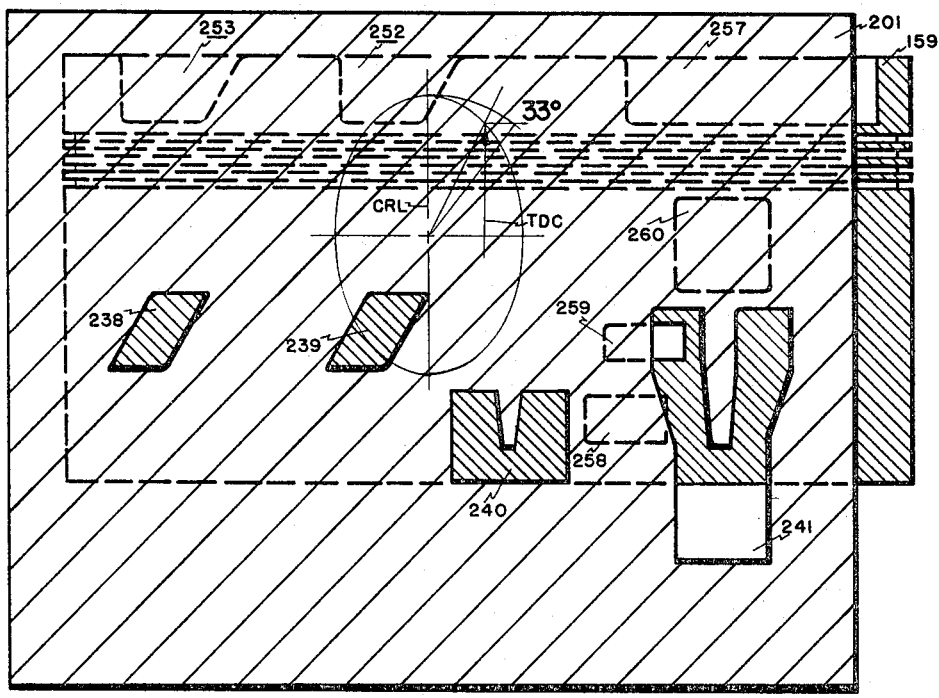
Figure 40:
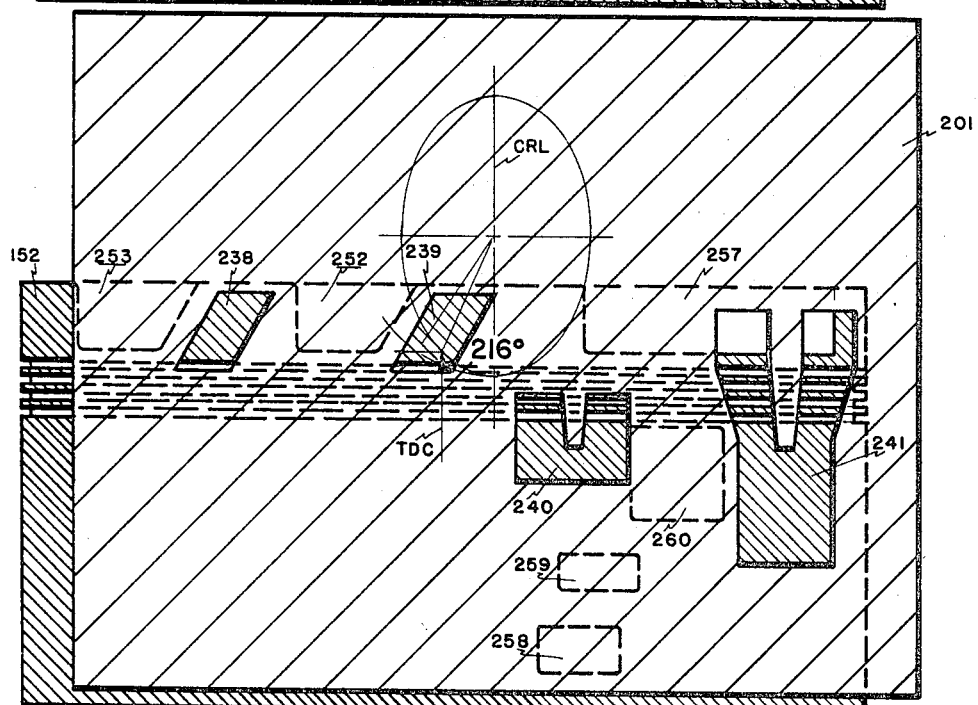

FIGURE 40 illustrates the 216° position of the piston with respect to the cylinder, during continued travel of the piston upwardly to effect compression within the firing chamber. The cylinder exhaust ports 238 and 239 are again sealed off by the piston 241. The cylinder bypass port 241 is ineffective since the lower portion thereof is not in communication either with a piston aperture or with the area beneath the skirt of the piston. However, the piston intake aperture 260 as shown is now beginning its registry with the cylinder intake port 240. Thus, the cylinder intake port 240 at this point starts the conduction of the fuel-air mixture underneath the piston crown through the successively aligned piston skirt openings 260, 259 and 258. The mixture will be supplied through the piston skirt openings substantially continuously as the piston moves all its way from the 216° position to as much as 33° past TDC, as shown in FIGURE 34, if required or if found to be advantageous under the use purposes involved.

FIGURE 46, fragmentarily shows a four section piston rod 264. The partially illustrated left-hand side of the piston rod is identical to the detailed right-hand side thereof. As shown, the piston rod 264 includes a pair of central members 265 which are flanged and bored at 266 to accommodate conventional attachments such as bolt assemblies 267. Central members 265 include interior shoulders 268 and 269 for purposes hereinafter set forth. Outer members 270 include piston rod mounting flanges 271, an exterior shoulder 272 and a splined portion 273 which is splined to the interior ring-like protuberance 274 of respective members 265. Hollow lug 275 is threaded into an interior threaded end 276 of member 270 and has spanner recesses 277 so that during assembly of the piston rod, the lug may be threaded into member 70 so as compress bearing shoulders 269 and 272 together and to thereby make a substantially rigid connection between members 270 and 265.

The right and left halves of the piston rod are secured together by attachments 267, with cotter keys 278 holding the nuts in place. The two halves of the piston rod are secured together around the shuttle which will then extend through the machined junction aperture 279.

Obviously the type of attachments for connecting members 270 and 265, and the type of securement for the piston rod halves may be varied as design standards and uses dictate.

FIGURE 47 is an enlarged, partially sectioned, detail taken within the arcuate line 47—47 in FIGURE 2, and shows a distributor mechanism which may be used for connection to the spark plug of each cylinder. As shown, the rotor shaft of the engine may be provided with a suitable cam lobe for actuating two oppositely disposed, spring loaded, breaker point assemblies 281 that are secured by brackets 282 to the distributor shell 283. The distributor shell 283 is supplied with either recess means 284 to receive retention ears 285. Ears 285 are fixed to bearing end plate 22 and bell 14' by cap screws 23', as hereinbefore described. The distributor shell 283 is snugly fitted at 286 over the bearing end plate 22. Condensers 287 are mounted on opposite sides of the distributor shell and are connected to the two spring loaded breaker point assemblies 281.

The distributor is illustrated diagrammatically in FIGURE 48. One side of each of the condensers 287 is maintained at a ground potential whereas the other side is connected by respective leads 290 and 291 to their respective, conventional spring loaded breaker point assemblies 281. The spring loaded breaker point assemblies are also connected by respective leads 292 and 293 to one side of the primary coils of the conventional induction coil units 289. The other sides of the primary coils are connected to a battery 294. A secondary coil of each coil unit 289 is maintained at ground potential and the remaining terminals of the secondary coils of each unit 289 are respectively coupled to their respective spark plugs 212, which are grounded in the usual manner.

The operation of the distributor circuit is as follows. The breaker point assemblies 281 are spring loaded and are normally closed. The left-hand breaker point assembly 281 is shown open in FIGURE 48 whereas the breaker point assembly on the right is shown closed. Assuming that the breaker point assembly 281 on the left has just opened, current flow from the battery 294 through the points to the ground side of the breaker points has been interrupted, thereby collapsing the flux field of the primary of left hand unit 289 so as to induce a high voltage in the secondary thereof that will create a spark at left plug 212. At the same time, condenser 287 charges and serves as a diversion for current flow to prevent arcing at the points. When the points on the left are again closed, the condenser therefor, having served its purpose as a safety device, simply discharges through the points.

When the cam lobe 280 turns to open the right hand breaker point assembly 281, the same phenomenon occurs. That is, the current from battery 294 through the primary coil of induction coil unit 289 is interrupted, thereby causing a collapse of the flux field of the primary so as to induce a high voltage in the secondary of the right hand unit 289. This creates a spark at plug 212 on the right-hand side. Coincident with the production of this spark there will be a charging of condenser 287 (on the right) through the primary winding of the induction coil unit 289, thereby preventing arcing at the points. Breaker point life, accordingly, is materially lengthened.

With the distributor system hereinabove described there is no external unit timing mechanism or gearing necessary to operate the distribution system since the cam lobe actuating the distributor points may be placed directly upon the rotor carrying shaft 35'. Timing may be adjusted by rotating distributor shell 283 with respect to bearing end plate 22'.

FIGURES 41, 42 and 43 show alternate and optional configurations which may be utilized for the rotor structure of the engine. In FIGURE 41 a rotor housing 12' is provided, and serves the same function as the rotor housing 12 in FIGURE 3. The shuttle assembly 47 and piston rod 46 and their assembly are the same as heretofore explained. Likewise, the structure of the two rotors 48' together with the shuttle spherical bearings 98 is substantially the same as illustrated in FIGURE 3.

As shown in FIGURE 41, rotors 48' are bored at 296 and have a bushing 297 pressed thereon. Bushing 297 receives a flanged stub shaft 298 that is secured by cap screws 299 to housing 12'. Stub shaft 298 has a channel passage which is threaded to receive an oil feed line 26 (FIGURES 41 and 3) that communicates through a port 300 in bushing 297 with the spherical bearing structure 98. Journalled upon bushing 297 is gear 302. The gear 302 is pinned to rotor 48' by machine screw 303 so that the gear 302 and rotor 48' on the left rotate together. If desired, gear 315 may be mounted upon gear hub 304 and pinned thereto as shown at 308. Gear hub 304 is keyed, as by spline 309, to sleeve 310 and against sleeve shoulder 311 a snap ring 312 and its cooperating sleeve recess 313. Bearing 315 is positioned against shoulder 34 and is held in place by a snap ring 316, suitably recessed, and by a bearing cover plate 317. The bearing cover plate is secured to the structure by cap screws 318. Partitions 319 are provided in housing 12' and serve the same functions as the previously explained partitions 71 of FIGURE 3.

Stub shaft 320 is journalled within bronze bushing 321 that is pressed into rotor 48'. Machine bolt 322 is recessed into gear 323 and connects the gear to rotor 48' as shown. The stub shaft 320 is fixed to rotor housing 12' by cap screws 324. A threaded port 325 receives oil feed line 26 and communicates with a passageway 327, which supplies lubricant to the spherical bearing structure 98 of the shuttle. The passageway 327 is blinded off at 328 by a set screw.

A spark advance governor 329 has its arm 330 welded or otherwise fixedly secured at 331 to rod 332. Retaining plates 333 and 334 are mounted to stub shafts 298 and 320 by recessed machine screws 335. Rotor retaining plate 334 and guide bushing 336 journal the rod 332 for rotational displacement. Guide bushing 336 includes an axial guide pilot protuberance 337 which seats into the pilot seat 338. Members 336, 334 and 335 should preferably be made of brass or other soft bearing material. Flange member 339 is disposed upon guide bushing 336 as shown and includes a set screw 340 which fits into bushing recess 341. The flange 339 carries the distributor points (not shown) on brackets 282, similar to the FIGURE 47 configuration, and the set screw 340 may be used to fix the disposition of the points with respect to the cam lobe 280 (see FIGURE 48). In such an arrangement the cam lobe will be secured to governor rod 332 by a hub 341' and a lock nut 342 threaded onto the end of rod 332.

An adjustment ring 344 is threaded onto sleeve 310 and is secured in place by a set screw 345. The adjustment ring 344 is preferably adjustable back and forth along the sleeve 310, as by threads, so that it can be adjusted to take up tolerances involved in coupling side gear 346 through its gear train to gear 347. Gear 347 is pinned at 348 to a gear hub 349 that is spline connected at 350 to a sleeve 351 which terminates in a housing 352 of the balancing gear assembly. Gear 347 is held on the extended sleeve by a locking ring 353. The opposite side gear 354 is spline connected at 355 to the end of shaft 310 as shown, and planet gears 356 intermesh with the two side gears 346 and 354. The planet gears 356 are journalled upon extensions 357 of a spider 358, which is the latter being spline connected to output shaft 34' at 359. Attachment devices such as rings 360 or cap screws 361 can be used to retain the planet gears on the spider 358.

The structure of FIGURE 41 is ideally suited to use where it is desired that the adjustment gear assembly 362, formed of planet gears 356 and side gears 346 and 354, be located outside the rotor housing 12' to facilitate servicing.

In operation, rotation of left rotor 48' is transmitted through gear 302, reversing gear 304 (corresponding to the reversing gear 37 in FIGURES 3 and 4), sleeve 310 and side gear 354 (meshing with planet gears 356) to the spider 358 and output shaft 34'. At the same time rotation of the opposite (right) rotor 48' is transmitted through gears 323 and 347 to housing 352, through the plate 365 that is bolted at 366 to housing 352, to the integral side gear 346, the planet gears, and spider 358 to shaft 34'. Power is therefore transmitted in balanced fashion from the two rotors 48 in essentially the same manner disclosed in connection with FIGURE 3.

Bearing 367 is held by retainer 368 and bearing plate is secured to rotor housing 12' by machine screws 370. The inner race of bearing 367 rests against shoulder 371 of gear housing 352.

Alternative structure 372, FIGURE 43, may be used in lieu of the gear structure enclosed within the housing 352 in FIGURE 41 to incorporate the balancing feature of the two rotor drives of the engine. Thus, instead of the side gears and planetary gears in housing 352 of FIGURE 41, there may be included a spider 373 having extensions 374 along an axis R. The extensions are each respectively journaled within a bore 375 of a respective planet shuttle 376. Two such planet shuttles 376, equidistant from output shaft 34', are illustrated and they operate in an identical manner. The two arms 377 of each planet shuttle 376 are respectively journalled equidistantly from pivot axis R within self-aligning bearings 378 on opposite sides of spider 372. A back plate or bearing seat means 379 is secured to housing 352 by means distantly from pivot axis R within self-aligning bearings are positioned by retainer rings 381, and the entire housing is enclosed by cover plate 382 as shown. A bearing socket member 383 is splined at 384 to sleeve 310 and seats against shoulder 385 of housing 352. As shown, the spider 372 is itself splined or otherwise keyed at 386 to output shaft 34'.

Thus, the opposite motions of the two rotors 48' are coupled through their respective gear lanes as before explained to bearing socket member 383 and also to member 379. The transfer of rotative moments to these members causes the two members to rotationally adjust with respect to each other so as to interlock the two lanes with the output shaft 34'. In the process of this adjustment the members 376 may be rotationally displaced slightly in opposite directions to take up backlash in the gears, and as a result of wear or slight deflections in the members involved.

All of the spherical bearing sets 378 are positioned in their respective seats by snap rings 381 cooperating with respective recesses 387 as shown.

Housings 352 in FIGURES 41 and 43 will be grease packed.

An exhaust manifold 388, shown in fragmentary view in FIGURE 41, is connected by conduit (not shown) directly to the exhaust ports of the cylinders.

An enlarged detail of the spark advance governor mechanism referenced as 329 in FIGURE 41 is shown in FIGURE 42. As shown, the counterweight 388 associated with the right-hand rotor 48' is radially bored at 389 and is threaded at 390 to receive an adjustment nut 391. The bore area 389 terminates in a shoulder 392, against which a governor member 396 is adapted to rest, and a control spring 393 is positioned between the slidable governor member and the nut 391. The spring biasing force on the governor member is adjusted by turning nut 391 into or out of bore 389. A link 394 is rotatably pinned at 395 to governor member 396 and is likewise rotatably pinned at 397 to the arm 330 that is affixed to governor rod 332.

In the operation of the spark advance governor mechanism as the speed of the engine increases, the centrifugal force exerted upon governor member 396 tends to compress spring 393. The resultant movement of governor member 396 is accompanied by a movement of link 394 that rotates arm 330 and the governor rod 332 about the axis of rod 332. This positions the cam lobe 280, relative to the distributor points affixed to brackets 282, in accordance with the speed of the engine.

In FIGURE 51 a preferred piston and piston rod assembly 400 which may be used either in the engine of the present invention or in other types of engines. The assembly 400 comprises: a piston crown member 401, the upper configuration of which may be identical to that previously described; a piston skirt member 402 preferably spaced from piston crown member 401 by a heat insulation member 403; recessed machine screws 404 set within the piston crown 401 and passed through member 403 and piston skirt 402 and threaded into the flange 405 of piston rod 406. The piston rod 406 is substantially identical to those heretofore described. Heat insulation member 403 is shown as a gasket but could as well be an O-ring or other suitable structure. When machine screws 404 are tightened the entire assembly, i.e. the piston crown member 401, piston skirt 402, and piston rod 406 is locked together. Gasket 403 also serves as an oil seal for the oil circulating region 408 of the piston. The input line 407 for cooling lubricant (oil) is positioned within and is coaxial with respect to piston rod 406. It is also passed through aperture 409′ in centering plate 409 and is retained in place by a nut 409″.

The crown and skirt of the piston may be fabricated from different material. Thus, the piston skirt member 402 may be a hard surface steel which as a bearing backing can be electro-plated with bronze or other suitable soft bearing material. By using steel, for example, which has a low coefficient of thermal expansion, the skirt may be fitted as tightly into the cylinder as possible in order that the cylinder ports be appropriately sealed. Skirt portion 402″ is spun to be as light as possible, whereas mounting portion 402′ is thicker so as to accommodate the rigid mounting of the piston skirt member 402 to piston crown member 401. The piston crown 401 need not have as large an outside diameter as the piston skirt since the piston rings carried by the ring lands effect the seal at the piston crown. Aluminum, which is a preferred metal for the piston crown, is a much better conductor of heat than steel and is much lighter. When the piston crown is fabricated from aluminum, the heat generated in the crown is conducted out the piston rings rather than being conducted into the piston skirt area to expand the skirt. Heretofore, skirt expansion has been compensated for by decreasing the outside diameter of the skirt area relative to the cylinder bore, but this is not a satisfactory solution for the structure of the present invention, because of the sealing requirements previously noted.

In FIGURE 44 the composite engine 410 includes a pair of oppositely revolving propellers 411 and 412 which are mounted upon the protruding ends of rotor shafts 35 and 35′. These shafts may be journalled within respective shaft support webs 413 and 414. The support webs 413 and 414 are integral with an air foil cylinder 415. Suitable bearings 416 journal the shafts 35 and 35′, as indicated in FIGURE 45.

The structure of the engine of FIGURE 44, engine 410, is similar to the engine structure of FIGURE 5 with the exception that all of the gearing, sleeves, and output shaft are removed. Thus, the only moving parts in the engine of FIGURE 44 is the shuttle assembly 47 with its journal bearings, the two rotors 48, and the rotor shafts 35 and 35′, and the piston rod assembly 46 and associated piston structure.

Thus, the structure shown in FIGURES 44 and 45 provides an effective means for producing tunnel-type air flow. For this purpose the propellers should have respectively opposite pitches. There are several self-balancing features of structure of FIGURE 4. The engine is mounted medially of the cylinder 415 so as to preclude the production of off-center torques with respect to its mounting in operation and the propellers rotate in opposite directions, thereby avoiding the production of unbalanced clockwise or counterclockwise torques such as are produced by the revolvement of a single propeller. Furthermore, balance is further obtained by the opposite rotation of the internal rotors of the engine and their associated equipment. The end result is a balanced structure free of vibration and extraneous torque production. The propellers are coaxial and are on opposite sides of the engine cylinders 10, so the continuous, undirectional air stream generated will air cool the engine. The exhaust ports (not shown) of the cylinders are disposed within the air stream, so the exhaust gases will be carried out by the air stream and will contribute to air stream flow through the cylinder 415.

The structure of FIGURES 44 and 45 may be made extremely light in weight to be a suitable power source for vertical flight equipment.

FIGURE 49 shows an engine of the invention arranged for Deisel fuel injection. The conventional spark plugs have been eliminated and Diesel fuel nozzles 420 have been provided for each of the respective cylinders 10. The nozzles connect with conducts 421 and 422 leading to a Diesel fuel injector 423, which is conventional, and which may be mounted on one of the rotor shafts 35, or 35′. Conduit 424 connects the injector 423 and the fuel supply. Air is passed through the respective intake ports of the two cylinders in a manner as before described in connection with a fuel-air mixture. Where the engine is arranged to use Diesel fuel, the cylinders of the engine will usually need to be water-cooled.

Where the cylinders are air-cooled, irrespective of the type of fuel used and provided design requirements so permit, each cylinder 10 can be equipped with a fan 425 and associated structure. This structure preferably comprises brackets 427 which are secured to the rotor housing end bell by the existing cap screws 13 and a respective cylinder section 428 welded, or otherwise affixed, to the brackets and having cross rods 429 supporting journals 430 for the shaft 431 of each fan blade 425. Affixed to each cylinder section and cross member rod structure are upper and lower shroud plates 432 and 433, respectively. The upper shroud plate 432 is illustrated on the right-hand side of FIGURE 49, whereas the upper shroud plate 432 is removed to show the lower shroud plate 433 on the left-hand side. The shroud plates may be relieved at 434 as design requirements dictate.

FIGURE 50 in conjunction with FIGURE 49 shows that the output shaft 34 of the engine may be supplied with a pair of pulleys 444 and 445 which are keyed to the output shaft. Belts 446 and 447 are passed around pulleys 444 and 445 and around pulleys 448 and 449, keyed to fan shafts 431, to drive the two fans 425 of FIGURE 49 (the right-hand fan not being shown). Structure other than the flywheel-type balanced rotors 48 and their respective, spherical type self-aligning bearings 98 shown in FIGURE 3 may be used to convert the reciprocating motion of the engine's piston rod 46 into rotating motion of rotor shafts 35, 35′ via shuttle assembly 47.

The structure of FIGURES 52 and 53 might be used, for example. Shuttle arms 47′ of shuttle 47 each carry a sleeve 450 rotatable mounted on a bushing 451 that is secured against collar 454 by a collar 452 and snap ring 453, seated within recess 453′. One end of each H-shaped double yoke 455 is secured to shafts 456, which are a part of and are integral with sleeve 450, by snap rings 457 that are disposed in interior recesses 458 of the double yoke. Roller bearings 459 are positioned within cups 460 that are positioned against the ends of shafts 456 by snap rings 457. Pins 462, pressed into reamed bores 466 of bosses 465 journal the other end of yoke 455. Each flange 467 may be made integral with its respective rotor shaft 35, 35'.

Yokes 455 serve as articulated links that journal shuttle assembly 47, and the shuttle assembly is rotatably held within a sleeve 450. The links pivot as the shuttles reciprocate.

FIGURE 54 is a pictorial representation of one typical set of relationships as to port timing respecting intakes and exhaust functions. This figure serves further to illustrate in conventional form the discussion associated with the discussion which relates to the matter of FIGURES 33 through 40. The various degree characterizations are representative only of one selected design.

Although preferred forms of my invention have been herein disclosed, it is to be understood that the present invention is made by way of example and that the variations are possible without departing from the subject matter coming within the scope of the following claims, which subject matter I regard as my invention.

I claim:

1. An internal combustion engine including in combination
   a piston rod having a central, longitudinal axis;
   means journaling said piston rod for rectilinear reciprocation;
   shuttle means mounted to said piston rod medially thereof, disposed transversely in right-angle relationship with respect thereto, and having a pair of rectilinear, oppositely extending arms, said shuttle means having a longitudinal, central axis intersecting said piston rod axis at a common intersection point;
   a pair of spaced rotors disposed equidistantly on opposite sides of said piston rod in the region of said shuttle means, said rotors having a common axis which intersects said piston rod axis, said common intersection point lying in said rotor common axis when said piston rod is at mid-strike position;
   a housing for said rotors and shuttle means;
   means coaxially journaling said rotors for enabling the mutual, opposite revolvement at equal angular velocities thereof;
   respective means, equidistant from said common intersection point, articulatedly and slidably connecting the respective shuttle arms, equally eccentrically, to respective ones of said rotors, the disposition and motion of said shuttle means being always in a reciprocating, right angle transverse plane with respect to said piston rod;
   first and second, outwardly facing pistons respectively joined to opposite ends of said piston rod;
   internal combustion means, including first and second cylinder means respectively encasing said first and second pistons, for supplying energy to said pistons in a regular sequential manner;
   an output shaft;
   first and second sleeves coaxially disposed about said output shaft;
   first gearing means intercoupling one of said rotors and the motion thereof to said first sleeve;
   second gearing means intercoupling the remaining rotor and the motion thereof to said second sleeve; and
   compensating means inter-engaging said first and second sleeves and the output shaft to equalize the power lanes between said rotors and said output shaft.

2. Structure according to claim 1, wherein the compensating means includes
   a spider affixed to the output shaft; and
   planet gears journaled on said spider and engaging the gearing coupling the rotors and the sleeves.

3. Structure according to claim 1, wherein the means coaxially journaling the rotors comprises
   a pair of spaced, coaxial rotor shafts respectively fixed to said housing; and wherein
      a first gear of each of said first and second gearing is respectively, freely journaled about its respective rotor shaft and keyed to its respective rotor.

4. Structure according to claim 1, wherein the means coaxially journaling the rotors comprises
   a pair of spaced, coaxial rotor shafts respectively journaled within said housing; and wherein
      a first gear of each of said first and second gearing is respectively mounted upon and fixed for rotation with a respective one of said rotor shafts, said rotors being respectively affixed to their said shafts.

5. An internal combustion engine including in combination
   a piston rod having a central, longitudinal axis;
   means journaling said piston rod for rectilinear reciprocation;
   shuttle means mounted to said piston rod medially thereof, disposed transversely in right-angle relationship with respect thereto, and having a pair of rectilinear, oppositely extending arms, said shuttle means having a longitudinal, central axis intersecting said piston rod axis at a common intersection point;
   a pair of spaced rotors disposed equidistantly on opposite sides of said piston rod in the region of said shuttle means, said rotors having a common axis which intersects said piston rod axis, said common intersection point lying in said rotor common axis when said piston rod is at mid-stroke position;
   a housing for said rotors and shuttle means;
   means coaxially journaling said rotors for enabling the mutual, opposite revolvement at equal angular velocities thereof;
   respective means, equidistant from said common intersection point, articulatedly and slidably connecting the respective shuttle arms, equally eccentrically, to respective ones of said rotors, the disposition and motion of said shuttle means being always in a reciprocating, right angle transverse plane with respect to said piston rod;
   first and second, outwardly facing pistons respectively joined to opposite ends of said piston rod;
   internal combustion means, including first and second cylinder means respectively encasing said first and second pistons, for supplying energy to said pistons in a regular sequential manner; and
   air conveying screw means, connected to and driven by the said oppositely rotating rotors exteriorly of said housing means.

6. Structure according to claim 5, further including
   a hollow air flow structure surrounding said cylinder means and said air conveying screw means; and wherein
      said air conveying screw means are mutually reversed so that a stream of air will be unidirectionally propelled within said hollow air flow structure across said cylinder means.

7. An internal combustion engine including, in combination,
   a hollow piston rod having a central, longitudinal axis;
   means journaling said piston rod for rectilinear reciprocation;
   hollow shuttle means rigidly fixed to said piston rod medially thereof, disposed transversely in right angle relationship with respect thereto, and having a pair of rectilinear oppositely extending arms, a longitudinal, central axis intersecting said piston rod axis at a common intersection point, such that the interiors of said shuttle means and said piston rod are intercommunicating, and lubricating ports extending through the shuttle arms from the interior thereof;

a pair of spaced rotors disposed equidistantly on opposite sides of said piston rod in the region of said shuttle means, said rotors having a common axis which intersects said piston rod axis, said common intersection point lying in said rotor common axis when said piston rod is at mid-stroke position;

means coaxially journaling said rotors for enabling the mutual opposite revolvement at equal angular velocities thereof;

respective means, equidistant from said common intersection point, articulatedly and slidably connecting the respective shuttle arms, equally eccentrically, to respective ones of said rotors, the disposition and motion of said shuttle means being always in a reciprocating, right-angle transverse plane with respect to said piston rod;

lubricating passages through said articulatedly and slideably connecting means and in lubricating proximity with said shuttle means and at least cyclically in communication with the said lubricating ports;

first and second, outwardly facing pistons respectively joined to opposite ends of the piston rod, each said piston including a crown having an interior cavity;

means for circulating a coolant through said piston cavities via said hollow piston rod and shuttle means; and internal combustion means including first and second pistons, for supplying energy to said pistons in a regular sequential manner.

8. An internal combustion engine including, in combination a hollow piston rod having a central, longitudinal axis;

means journaling said piston rod for rectilinear reciprocation;

shuttle means rigidly fixed to said piston rod medially thereof, disposed transversely in right-angle relationship with respect thereto, and having a pair of rectilinear, oppositely extending arms, and a longitudinal, central axis intersecting said piston rod axis at a common intersection point;

a pair of spaced rotors disposed equidistantly on opposite sides of said piston rod in the region of said shuttle means, said rotors having a common axis which interesects said piston rod axis, said common intersection lying in said rotor common axis when said piston rod is at mid-stroke position;

means coaxially journaling said rotors for enabling the mutual, opposite revolvement at equal angular velocities thereof;

respective means, equidistant from said common intersection point, articulatedly and slidably connecting the respective shuttle arms, equally eccentrically, to respective ones of said rotors, the disposition and motion of said shuttle means being always in a reciprocating, right-angle transverse plane with respect to said piston rod;

first and second, outwardly facing pistons respectively joined to opposite ends of said piston rod, each said piston including a crown having an interior cavity, means for circulating a coolant through said piston cavities via said hollow piston rod and a piston skirt member having at least one intake aperture therethrough; and internal combustion means including first and second cylinder means respectively encasing said first and second pistons, for supplying energy to said pistons in a regular sequential manner, said cylinder means including exhaust port means, intake port means, and medially disposed bypass port means, the latter affording communication between cylinder areas above and below said piston during a certain range of medial piston positions and the intake port means being positioned to be in alignment with the intake aperture through the piston skirt member during the intake portion of the piston stroke.

9. Structure according to claim 8, further including rings surrounding the crown member;

means thermally isolating said crown member and the skirt member; and means securing said crown member, skirt member, and thermal isolating member together.

10. Structure according to claim 8, further including means for supplying lubricant to the piston rod, through the means journaling said piston rod; and a stuffing gland having a wall spaced interiorly of and extending into its cylinder, whereby the piston skirt slides between the cylinder and the stuffing gland wall during piston reciprocation means for scraping lubricant from the piston rod and passage means through the stuffing gland wall whereby the lubricant is circulated, as a coolant, through the said wall after being scraped from the piston rod.

11. Structure according to claim 1 wherein said piston rod journaling means comprise self-aligning bearing means seated within the enclosure formed by said housing means and said cylinder means and journaling said piston rod on opposite sides of said shuttle means.

12. Structure according to claim 1 wherein said sleeves are proximately disposed end to end, and wherein said compensating means includes a spider fixed to the output shaft a pair of equal side gear means respectively integral with the proximate ends of respective ones of said sleeves, and a pair of equal planet gears retentively journaled about a common radial axis upon said spider on opposite sides of said output shaft and engaging both of said side gear means.

13. Structure according to claim 1 wherein said compensating means includes comprises additional shuttles journaled about a common radial pivot axis on opposite sides of and equidistant from said output shaft and parallel thereto, a pair of bearing seat means respectively secured to said sleeves, and a plurality of means equidistant from said pivot axis articulatedly and slidably journaling said additional shuttles on opposite sides thereof in said bearing seat means.

14. Structure according to claim 1 wherein said pistons each have a crown member, rings seated on said crown member, and a skirt member, means thermally isolating said crown and skirt members disposed therebetween, and means securing said crown member, skirt member, and thermally isolating means together.

15. Structure according to claim 8 wherein the piston skirt of each of said pistons includes a plurality of intake apertures arranged for sequential, compositely uninterrupted registration with said cylinder intake port during the intake portion of the piston stroke.

16. Structure according to claim 8 wherein said pistons each include: a piston crown having exhaust channel means registering with said cylinder exhaust port means during the exhaust portion of the cycle; a piston crown bypass scavenging recess means disposed in registry with said cylinder bypass port during the scavenging portion of the stroke; and said bypass port means comprising an enlarged port having a medial, longitudinal, piston ring slide finger.

References Cited

UNITED STATES PATENTS

| 1,292,882 | 1/1919 | Riedler | 123—41.37 |
| 2,337,090 | 12/1943 | Feroy | 123—41.37 |
| 2,390,915 | 12/1945 | Bayles | 123—41.37 |
| 2,664,420 | 1/1954 | Teisen | 123—56 X |
| 2,828,906 | 4/1958 | Hardman | 230—56 |

FOREIGN PATENTS 18,640      1891      Great Britain.

WENDELL E. BURNS, *Primary Examiner.*